(12) United States Patent
Harviainen

(10) Patent No.: US 11,544,031 B2
(45) Date of Patent: *Jan. 3, 2023

(54) METHODS AND SYSTEMS OF AUTOMATIC CALIBRATION FOR DYNAMIC DISPLAY CONFIGURATIONS

(71) Applicant: PCMS Holdings, Inc., Wilmington, DE (US)

(72) Inventor: Tatu V. J. Harviainen, Helsinki (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,808

(22) Filed: Nov. 25, 2019

(65) Prior Publication Data

US 2020/0089458 A1    Mar. 19, 2020

Related U.S. Application Data

(63) Continuation of application No. 15/763,379, filed as application No. PCT/US2016/054931 on Sep. 30, 2016, now Pat. No. 10,545,717.

(Continued)

(51) Int. Cl.
*G06F 3/147* (2006.01)
*G06F 3/01* (2006.01)
(Continued)

(52) U.S. Cl.
CPC ........... *G06F 3/147* (2013.01); *G02B 27/017* (2013.01); *G06F 3/011* (2013.01); *H04N 13/156* (2018.05);
(Continued)

(58) Field of Classification Search
CPC ....... G06F 3/147; G06F 3/011; H04N 13/332; H04N 13/344; H04N 13/156;
(Continued)

(56) References Cited

U.S. PATENT DOCUMENTS

| | | |
|---|---|---|
| 4,638,428 A | 1/1987 | Gemma |
| 5,589,980 A | 12/1996 | Bass |

(Continued)

FOREIGN PATENT DOCUMENTS

| | | |
|---|---|---|
| CN | 104238119 A | 12/2014 |
| CN | 104380347 A | 2/2015 |

(Continued)

OTHER PUBLICATIONS

Schwarz, Julia, et. al. "Phone as a Pixel: Enabling Ad-Hoc, Large-Scale Displays Using Mobile Devices". Session: Phone Fun: Extending Mobile Interaction. CHI 2012, May 5-10, 2012, pp. 2235-2238.

(Continued)

*Primary Examiner* — William A Beutel
(74) *Attorney, Agent, or Firm* — Invention Mine LLC

(57) ABSTRACT

Systems and methods are described for capturing, using a forward-facing camera associated with a head-mounted augmented reality (AR) head-mounted display (HMD), images of portions of first and second display devices in an environment, the first and second display devices displaying first and second portions of content related to an AR presentation, and displaying a third portion of content related to the AR presentation on the AR HMD, the third portion determined based upon the images of portions of the first and second display devices captured using the forward-facing camera. Moreover, the first and second display devices may be active stereo display, and the AR HMD may simultaneously function as shutter glasses.

23 Claims, 20 Drawing Sheets

Related U.S. Application Data

(60) Provisional application No. 62/261,029, filed on Nov. 30, 2015, provisional application No. 62/260,069, filed on Nov. 25, 2015, provisional application No. 62/239,143, filed on Oct. 8, 2015.

(51) Int. Cl.
*G02B 27/01* (2006.01)
*H04N 13/344* (2018.01)
*H04N 13/156* (2018.01)
*H04N 13/363* (2018.01)
*H04N 13/361* (2018.01)
*H04N 13/332* (2018.01)

(52) U.S. Cl.
CPC ......... *H04N 13/332* (2018.05); *H04N 13/344* (2018.05); *H04N 13/361* (2018.05); *H04N 13/363* (2018.05); *G02B 2027/014* (2013.01); *G02B 2027/0134* (2013.01); *G02B 2027/0138* (2013.01); *G09G 2320/0693* (2013.01)

(58) Field of Classification Search
CPC ............... H04N 13/363; H04N 13/361; G02B 27/017; G02B 2027/0134; G02B 2027/0138; G02B 2027/014; G09G 2320/0693
See application file for complete search history.

(56) References Cited

U.S. PATENT DOCUMENTS

| | | | |
|---|---|---|---|
| 5,633,993 | A | 5/1997 | Redmann |
| 5,956,180 | A | 9/1999 | Bass |
| 6,906,762 | B1 | 6/2005 | Witehira |
| 7,133,083 | B2 | 11/2006 | Jaynes |
| 7,907,790 | B2 | 3/2011 | Mitsuhiro |
| 7,953,462 | B2 | 5/2011 | Vartanian |
| 8,068,886 | B2 | 11/2011 | Vartanian |
| 8,427,396 | B1 | 4/2013 | Kim |
| 8,479,226 | B1 | 7/2013 | Cave |
| 8,576,276 | B2 | 11/2013 | Bar-Zeev |
| 8,711,091 | B2 | 4/2014 | Nomura |
| 8,730,354 | B2 | 5/2014 | Stafford |
| 8,988,343 | B2 | 3/2015 | Fei |
| 2001/0053996 | A1 | 12/2001 | Atkinson |
| 2003/0080923 | A1 | 5/2003 | Suyama |
| 2004/0125044 | A1 | 7/2004 | Suzuki |
| 2008/0291225 | A1 | 11/2008 | Arneson |
| 2008/0320126 | A1 | 12/2008 | Drucker |
| 2010/0007582 | A1 | 1/2010 | Zalewski |
| 2010/0053164 | A1 | 3/2010 | Imai |
| 2010/0321275 | A1 | 12/2010 | Hinckley |
| 2010/0328447 | A1 | 12/2010 | Watson |
| 2011/0157555 | A1* | 6/2011 | Mashitani ............... G03B 35/24 353/7 |
| 2011/0199460 | A1* | 8/2011 | Gallagher ............ H04N 13/337 348/46 |
| 2011/0221962 | A1 | 9/2011 | Khosravy |
| 2012/0127284 | A1* | 5/2012 | Bar-Zeev ............... G06T 19/006 348/53 |
| 2012/0146894 | A1 | 6/2012 | Yang |
| 2013/0155210 | A1 | 6/2013 | Ma |
| 2013/0290876 | A1 | 10/2013 | Anderson |
| 2013/0300637 | A1 | 11/2013 | Smits |
| 2014/0160002 | A1 | 6/2014 | Dent |
| 2014/0232829 | A1* | 8/2014 | Lee ........................ H04N 13/25 348/47 |
| 2014/0232880 | A1 | 8/2014 | Murase |
| 2014/0320399 | A1* | 10/2014 | Kim ................... G02B 27/0172 345/156 |
| 2015/0104038 | A1 | 4/2015 | Kim |
| 2016/0212538 | A1 | 7/2016 | Fullam |
| 2016/0239975 | A1* | 8/2016 | Liu ........................... G06T 7/80 |

FOREIGN PATENT DOCUMENTS

| | | |
|---|---|---|
| CN | 104508538 A | 4/2015 |
| EP | 2713369 | 4/2014 |
| EP | 2869573 | 5/2015 |
| JP | 2014170374 A | 9/2014 |
| WO | 2011109903 | 9/2011 |
| WO | 2012147702 A1 | 11/2012 |

OTHER PUBLICATIONS

Azuma, Ronald, et. al. "Recent Advances in Augmented Reality". IEEE Computer Graphics and Applications, Nov./Dec. 2001, pp. 34-47.

Yang, Ungyeon, et. al., "Mixed Display Platform to Expand Comfortable Zone of Stereoscopic 3D Viewing". ETRI Journal, vol. 35, No. 2, Apr. 2013, pp. 352-355.

Härmä, Aki, et. al., "Augmented Reality Audio for Mobile and Wearable Appliances". Augmented Reality Audio for Appliances, Audio Eng. Soc., vol. 52, No. 6, Jun. 2004, pp. 618-639.

Prasuethsut, Lily., "Taking Mini's augmented reality glasses for a test drive". Techradar article on Qualcomm & Mini in car AR concept. Web Archive dated Aug. 1, 2015. Available at: https://web.archive.org/web/20150801211211/www.techradar.com/news/wearables/mini-partnered-with-qualcomm-to-make-augmented-reality-glasses-1291801, 6 pages.

Benko, Hrvoje., et. al., "Dyadic Projected Spatial Augmented Reality". UIST '14 Proceedings of the 27th annual ACM symposium on User interface software and technology, Oct. 2014, pp. 645-655.

Jones, Brett R., et al. "IllumiRoom: Peripheral Projected Illusions for Interactive Experiences". Proceedings of the SIGCHI Conference on Human Factors in Computing Systems. ACM, (2013), pp. 869-878.

Heun, Valentin, et. al., "Smarter Objects: Using AR technology to Program Physical Objects and their Interactions". CHI 2013, Extended Abstract, Apr. 27-May 2, 2013, 6 pages.

International Search Report and the Written Opinion of the International Searching Authority for PCT/US2016/047370, dated Nov. 9, 2016, 12 pages.

Written Opinion of the International Preliminary Examining Authority for PCT/2016/047370 dated Jul. 18, 2017, 9 pages.

International Preliminary Report on Patentability for PCT/US2016/047370 completed on Oct. 30, 2017, 21 pages.

"The Future of Display Technology from CES 2015". Available at: http://pureimage.ca/future-display-technology-ces-2015/, (2015).

Amadeo, Ron, "Report: Google X working on seamless, modular large-format displays". Available at: http://arstechnica.com/gadgets/2014/10/03/report-google-x-working-on-seamless-modular-large-format-displays/, Oct. 3, 2014, 3 pages.

Bullis, Kevin, "Bendable Displays are Finally Headed to Market". MIT Technology Review, available at: http://www.technologyreview.com/news/529991/bendable-displays-are-finally-headed-to-market/, Aug. 13, 2014, 5 pages.

Raskar, Ramesh, et al, "The Office of the Future: A Unified Approach to Image-Based Modeling and Spatially Immersive Displays". Computer Graphics Proceedings, SIGGRAPH 98, Jul. 19-24, 1998, pp. 1-10.

Wolf, Lior., et. al. "Non-homogeneous Content-driven Video-retargeting". The School of Computer Science, Tel-Aviv University, (2007), 7 pages.

Nacenta, Miguel, et. al. "E-conic: A Perspective-Aware Interface for Multi-Display Environments". UIST' 07, Oct. 2017, ACM 978-1-59593-679, pp. 279-288.

Park, Hanhoon, et. al. "Undistorted Projection onto Dynamic Surface". Division of Electrical and Computer Engineering, Hanyang University, Dec. 2006, 10 pages.

International Search Report and the Written Opinion of the International Searching Authority for PCT/US2016/054931 dated Dec. 19, 2016, 11 pages.

(56) References Cited

OTHER PUBLICATIONS

Rolland, Jannick P., et. al., "Multifocal Planes Head-Mounted Displays". Applied Optics, vol. 39, No. 19, Jul. 2000, pp. 3209-3215.
International Preliminary Report on Patentability for PCT/US2016/054931 completed on Sep. 15, 2017, 16 pages.
Free, John, "Multi-screen 3-D TV". Electronics Newsfront, Popular Science, Dec. 1992, p. 25.
Lee, Nicole, "castAR Augmented Reality Glasses Hit Kickstarter With a Clip-On That Transforms Them into a VR Headset". Web article posted online on Oct. 14, 2013. Retrieved from; http://www.engadget.com/2013/10/14/castar-kickstarter-launch/, 4 pages.
Alfaro, Santiago, "Surround Vision: A handheld screen for accessing peripheral content around the TV". Massachusetts Institute of Technology Thesis, Sep. 2010, available at: http://web.media.mit.edu/~vmb/papers/alfaroms.pdf, pp. 1-68.
Sakurai, Satoshi, et. al., "A Middleware for Seamless Use of Multiple Displays". Springer-Verlag, (2008), pp. 252-266.
Rädle, Roman, et. al., "HuddleLamp: Spatially-Aware Mobile Displays for Ad-hoc Around-the-Table Collaboration". Proceedings of the 2014 ACM International Conference on Interactive Tabletops and Surfaces, Nov. 2014, pp. 45-54.
Takashima, Kazuki, et. al., "A Shape-Shifting Wall Display that Supports Individual and Group Activities". Technical Report 2015-1072-05, Department of Computer Science, University of Calgary, (2015), 8 pages.
Alexander, Jason, et. al., "Tilt Displays: Designing Display Surfaces with Multi-Axis Tilting and Actuation". MobileHCI' 12. ACM, Sep. 2012. p. 161-170.
Salzmann, Mathieu, et. al., "Convex Optimization for Deformable Surface 3-D Tracking". In: Computer Vision, (2007). ICCV 2007. IEEE 11th International Conference on. IEEE, (2007), pp. 1-8.

NVidia 3D Vision. (n.d.). Retrieved Aug. 8, 2016, from https://www.nvidia.com/object/3d-vision-main.html.
NVidia 3DTV Play. (n.d.). Retrieved Jul. 6, 2016, from http://www.nvidia.com/object/3dtv-play-overview.html.
Nacenta, Miguel A., et. al., "E-conic: A Perspective-Aware Interface for Multi-Display Environments". YouTube link available at: https://www.youtube.com/watch?v=BX9Wc64F-Rs, Published on Dec. 17, 2008, 50 pages.
Hatmaker, Taylor. "Amazon Fire Phone Dynamic Perspective 3D Demo". Web Link available at: https://vimeo.com/98661674, dated Jun. 19, 2014, 28 pages.
Csik, Chris, "MIT's Junkyard Jumbotron Turns Your Motley Collection of Devices into One Large Display (video)". Engadget web article, Mar. 14, 2011, 37 pages.
Li, Ming, et. al., "Dynamic Tiling Display: Building an Interactive Display Surface Using Multiple Mobile Devices". Proceedings of the 11th International Conference on Mobile and Ubiquitous Multimedia (MUM 2012), Dec. 4-6, 2012, 4 pages.
Figl Michael. et al., "The Control Unit for a Head Mounted Operating Microscope Used for Augmented Reality Visualization in Computer Aided Surgery". Proceedings of the International Symposium on Mixed and Augmented Reality, (2002), pp. 69-75.
Yongtian, Wang, et. al., "Outdoor Augmented Reality and its Application in Digital Reconstruction of Yuanmingyuan". Bulletin of National Natural Science Foundation of China 2, (2006), 16 pages.
Benko, H. et al., "FoveAR: Combining an Optically See-Through Near-Eye Display with Spatial Augmented Reality Projections", in the Proceedings of the 28th Annual ACM Symposium on User Interface Software & Technology, Nov. 2015, pp. 129-135 https://doi.org/10.1145/2807 442.2807 493 (7 pages).

* cited by examiner

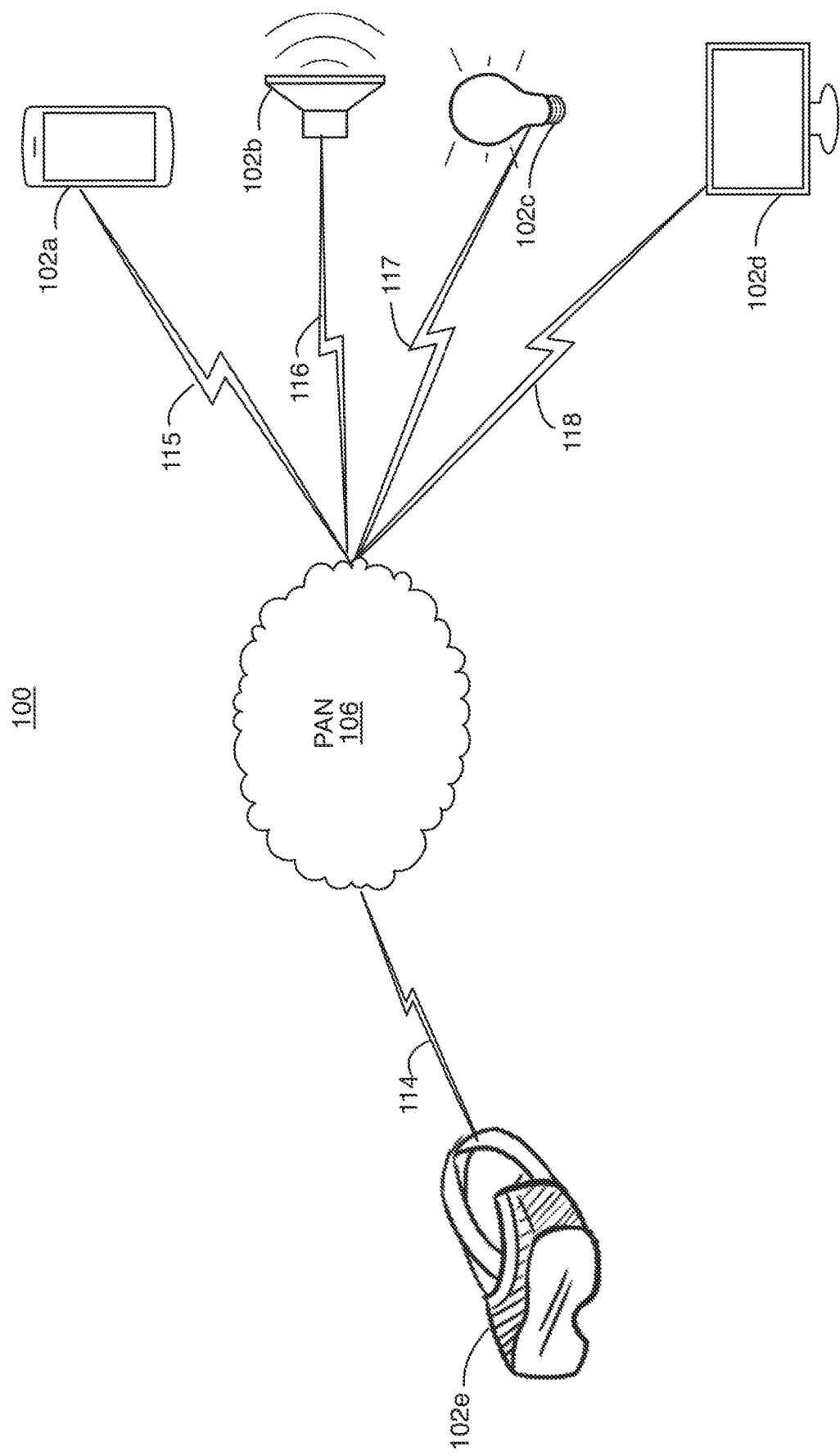

METHODS AND SYSTEMS OF AUTOMATIC CALIBRATION FOR DYNAMIC DISPLAY CONFIGURATIONS

CROSS-REFERENCE TO RELATED APPLICATIONS

The present application is a continuation of U.S. patent application Ser. No. 15/763,379, entitled "METHODS AND SYSTEMS OF AUTOMATIC CALIBRATION FOR DYNAMIC DISPLAY CONFIGURATIONS," filed Mar. 26, 2018, which is hereby incorporated by reference herein in its entirety, which is a national stage application under 35 U.S.C. § 371 of International Application No. PCT/US2016/054931, entitled "METHODS AND SYSTEMS OF AUTOMATIC CALIBRATION FOR DYNAMIC DISPLAY CONFIGURATIONS", filed Sep. 30, 2016, which claims benefit under 35 U.S.C. § 119(e) from U.S. Provisional Application No. 62/239,143, entitled "METHODS AND SYSTEMS OF AUTOMATIC CALIBRATION FOR DYNAMIC DISPLAY CONFIGURATIONS," filed Oct. 8, 2015, U.S. Provisional Application No. 62/260,069, entitled "METHODS AND SYSTEMS FOR OPTIMIZING DISPLAY DEVICE OUTPUT USING A SECONDARY DISPLAY DEVICE," filed Nov. 25, 2015, and U.S. Provisional Application No. 62/261,029, entitled "METHODS AND SYSTEMS FOR OPTIMIZING DISPLAY DEVICE OUTPUT USING A SECONDARY DISPLAY DEVICE," filed Nov. 30, 2015.

FIELD

The present disclosure generally relates to immersive 3D content using combinations of optical see-through augmented reality (AR) head mounted display (HMD) and traditional displays.

BACKGROUND

There is currently increasing interest and activity in the area of Virtual Reality (VR) and AR. Major industry players are working on consumer oriented AR/VR HMD devices, while activity around AR and VR content seems to be actively explored by various stakeholders in the Hollywood entertainment industry. If consumer AR/VR takes off, there will be a great demand for solutions that enable content consumption with larger variety of devices besides just AR or VR HMDs which are currently driving the development.

The illusion that VR aims to create is one where the user feels as if he/she is present in a synthetic virtual world instead of physical reality. This illusion can be achieved by substituting the users audiovisual perception of the real world with synthetic images and sounds generated by a computer simulation. For a convincing illusion, the images and sounds generated by the computer simulation should have a consistent spatial relation with the user and respond to the changes of viewpoint caused by the user's motion, so that the user can explore the virtual world just as he or she can explore the real physical world. Similar to VR, AR aims at generating an illusion, in this case one where virtual elements are attached to the physical environment, creating an alternative version of the physical reality around the user.

At the same time that AR and VR HMDs are paving the way for immersive experiences in the living rooms, it can be observed how dimensions of consumer displays are growing. People are willing to have larger and larger displays in their living rooms. However, despite the growing size, current flat or slightly curved displays do not comprehensively support immersive experiences such as the ones created for the AR/VR HMDs. However, as display technology evolves, in the near future users may have even more display area available in their living rooms; the displays may become non-planar and occupy several walls and/or be deformable so that the shape and configuration of the display can change to match the content being consumed and context of use.

AR and VR HMDs are also not suited for displaying fully immersive content on their own, in part due to the semi-opaque nature of optical see-through displays and limited field of view. Transparency of the display causes virtual content to appear as a ghost image on top of the users view of the real world, while limited field of view further disrupts the illusion as the view cuts off sharply towards the edge of vision.

Optical see-through AR HMDs are currently being pushed to the consumer market by several manufacturers, including major industry players such as Microsoft, Sony, Epson, etc. These first generation devices aimed for consumer markets have shortcomings, especially in terms of limited field of view, luminance and transparency of the images they can produce. However, it is realistic to anticipate that next device generations will fix at least some of these shortcomings and offer high resolution AR visualization with good image quality in comfortable form factor.

Despite the probable future improvements of the AR HMDs, reproducing the resolution and color/luminance of traditional displays using optical see-through HMDs may be difficult. Furthermore, current technologies used for AR HMDs provide only fixed eye accommodation distance, and by doing so, present one more shortcoming to consider.

AR HMDs also have characteristics that make them superior to traditional displays in some areas. AR HMDs enable users to move freely about an environment without compromising overall image quality. Further, most smart-glass HMDs may track user movement and create an approximation of the environment geometry, which in turn enables augmentation and rich interaction with the environment. Also, as the HMDs display near the user's eyes, users have a clear line of sight to the display.

In the area of shape-changing displays, most related examples are production-ready display devices that can be adjusted between curved and flat shape; moreover, there has been some speculation regarding tiled display technology. Besides displays composed of several planar displays or slightly curving displays, display manufacturers have long been working on truly flexible displays, with production-ready solutions becoming closer to realization. In the academic research community, some examples of related prototype installations exist; robotic display and small tile display, as described by way of example in TAKASHIMA, Kazuki, et al. A Shape-Shifting Wall Display that Supports Individual and Group Activities. 2015 and ALEXANDER, Jason; LUCERO, Andrés; SUBRAMANIAN, Sriram. Tilt displays: designing display surfaces with multi-axis tilting and actuation. In: Proceedings of the 14th international conference on Human-computer interaction with mobile devices and services. ACM, 2012. p. 161-170. Some related devices and methods may be found in: U.S. Pat. Nos. 8,988,343; 8,711,091; and U.S. Patent Application Publication No. US20100321275 A1. However, there seem to be few examples of deformable or tiled display systems that would allow dynamic adjustment during the experience.

OVERVIEW

Methods and systems herein describe a process that receives sensor based data of a display configuration and user information (e.g., user position, user eye position) as inputs, and based on the received inputs modifies a graphic output stream produced by a currently active application so that the graphics output is adjusted to match the current display configuration and context of use. An overview of the components related with this process is illustrated in FIG. 2.

Described embodiments automatically adjust the rendering output of an application to match a display configuration which can be dynamically changed, e.g., the shape of the display can be changed during the run-time execution of the application, the orientation of the display, relative positions of two or more displays, etc.

Some embodiments are based on analyzing the sensor data from sensors observing the users and the display configuration. Changes in the rendering required to match the display configuration are injected to the intercepted graphics API calls produced by the application. The goal is to enable highly immersive rendering of unmodified applications while at the same time taking into an account the content and context of viewing in order to improve results.

In some embodiments, the display setup is instrumented with sensor(s) configured to detect the current display layout configuration. In addition to display configuration sensors, the area surrounding the display configuration is observed with a sensor that enables detection of users in the front of the display. Embodiments herein describe a process where graphics API calls produced by an unmodified application are intercepted, view transformations are calculated based on display configuration information and head tracking, and then the view transformations are injected to the graphics API calls sent to displays via a display driver. This approach enables immersive rendering of unmodified applications and dynamic changing of display configuration even during the application runtime. In the methods described below, the changes in the display configuration are constantly monitored and output parameters are adjusted to take into account all detected changes in the configuration during the runtime of the application without explicit user involvement.

As a result of this process, the user will be provided with an immersive rendering of the currently active application adapted to the current display configuration. For example, a user playing a 3D first person shooter game on a setup with multiple displays can adjust how the screens are positioned around him/her during the gameplay. While the orientation of the displays is changing, the user will experience correct immersive rendering of the gameplay as if he/she was looking at the game world through the combination of several displays. Similarly, in the case of flexible display, the user can, during application run-time, change the shape of the display from a flat planar shape on one wall to a more immersive shape by just moving the flexible display to a corner so that it extends from one wall to another gradually bending 90 degrees between the walls.

In a method in accordance with some embodiments, the quality and immersion achieved is better than can be achieved with optical see-through AR HMDs or traditional displays alone. In some embodiments, secondary display devices may be used to fill in the gaps in the rendering on the primary device or a set of primary devices. For example, in cases where there are several large scale displays available in the space, an AR HMD may be used to bridge any optical gap between such displays. In other cases, where an AR HMD is the primary display device for the content, traditional displays may be used to fill in the areas that fall outside the limited field of view of the AR HMD. For example, the primary device(s) may be one or more devices judged or selected to be most suitable for the display of the content or a portion of the content.

Some embodiments described herein may utilize a method based on combining approaches that selectively split the content to different displays while also enabling immersive rendering based on head tracking. In addition, this method constantly monitors the output and corrects unwanted occlusions and shadows caused by physical objects between the displays and the viewer. In situations where there are various display devices available, one or more of them is used in combination to fill in the gaps in the rendering on an AR HMD device. For example, in cases where there are several large scale displays available in the space, AR HMD is used to bridge the optical gap between these display devices. In other cases, where an AR HMD is the primary display device for the content, traditional displays fill in the areas that fall outside the limited field of view of the AR HMD.

BRIEF DESCRIPTION OF THE DRAWINGS

A more detailed understanding may be had from the following description, presented by way of example in conjunction with the accompanying drawings.

FIG. 1A depicts an example communications system in which one or more disclosed embodiments may be implemented.

DETAILED DESCRIPTION

Figure 1B:
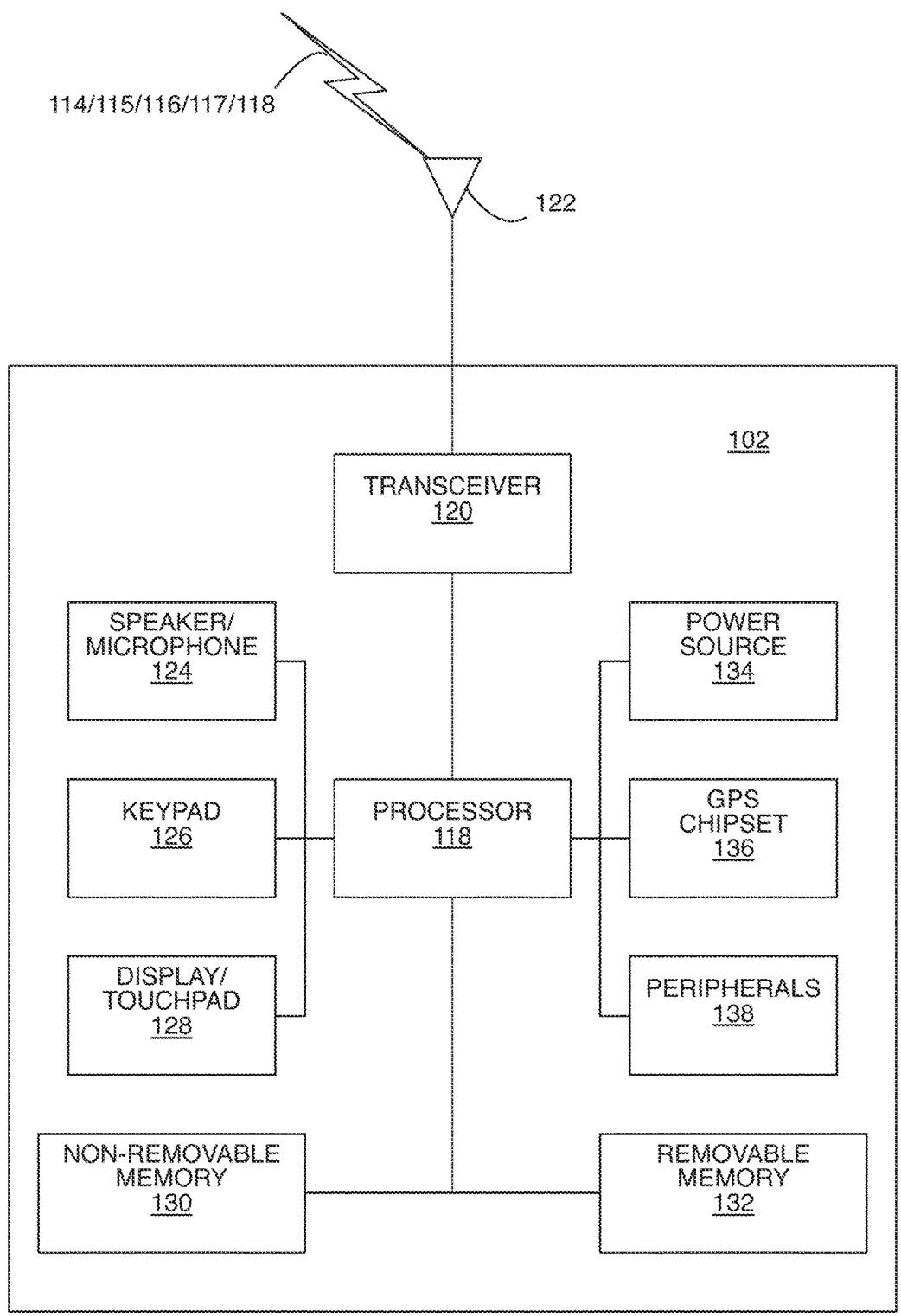
FIG. 1B depicts an example client device that may be used within the communications system of FIG. 1A.

A detailed description of illustrative embodiments will now be provided with reference to the various Figures. Although this description provides detailed examples of possible implementations, it should be noted that the provided details are intended to be by way of example and in no way limit the scope of the application. The systems and methods relating to immersive augmented reality may be used with the wired and wireless communication systems described with respect to FIGS. 1A and 1B. As an initial matter, these wired and wireless systems will be described.

FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wired and wireless users to access such content through the sharing of system resources, including wired and wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like. The communications systems 100 may also employ one or more wired communications standards (e.g., Ethernet, DSL, radio frequency (RF) over coaxial cable, fiber optics, and the like.

As shown in FIG. 1A, the communications system 100 may include client devices 102a, 102b, 102c, 102d, and/or 102e, Personal Area Network (PAN) 106, and communication links 114/115/116/117/118, though it will be appreciated that the disclosed embodiments contemplate any number of client devices, base stations, networks, and/or network elements. Each of the client devices 102a, 102b, 102c, 102d, 102e may be any type of device configured to operate and/or communicate in a wired or wireless environment. By way of example, the client device 102a is depicted as a tablet computer/touch screen smartphone, the client device 102b is depicted as a speaker, the client device 102c is depicted as a lighting device, the client device 102d is depicted as a television, and the client device 102e is depicted as a HMD (AR or VR in some embodiments).

Some or all of the client devices 102a, 102b, 102c, 102d, 102e in the communications system 100 may include multi-mode capabilities, i.e., the client devices 102a, 102b, 102c, 102d, and 102e may include multiple transceivers for communicating with different wired or wireless networks over different communication links.

In some embodiments, client devices 102a, 102b, 102c, 102d, and 102e communicate with each other using local communications protocols via PAN 106. For example, the client devices may communicate using Bluetooth, Wi-Fi, wireless LAN (WLAN), or any other forms of wireless local communication protocols.

FIG. 1B depicts an example client device that may be used within the communications system of FIG. 1A. In particular, FIG. 1B is a system diagram of an example client device 102. As shown in FIG. 1B, the client device 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. It will be appreciated that the client device 102 may represent any of the client devices 102a, 102b, 102c, 102d, and 102e, and include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the client device 102 to operate in a wired or wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from PAN 106 over communication links 114/115/116/117/118. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. In yet another embodiment, the transmit/receive element may be a wired communication port, such as an Ethernet port. It will be appreciated that the transmit/receive element 122 may be configured to transmit and/or receive any combination of wired or wireless signals.

In addition, although the transmit/receive element 122 is depicted in FIG. 1B as a single element, the client device 102 may include any number of transmit/receive elements 122. More specifically, the client device 102 may employ MIMO technology. Thus, in one embodiment, the wireless transmit/receive unit (WTRU) 102 may include two or more transmit/receive elements 122 (e.g., multiple antennas) for transmitting and receiving wireless signals over communication links 114/115/116/117/118.

The transceiver 120 may be configured to modulate the signals that are to be transmitted by the transmit/receive element 122 and to demodulate the signals that are received by the transmit/receive element 122. As noted above, the client device 102 may have multi-mode capabilities. Thus, the transceiver 120 may include multiple transceivers for enabling the client device 102 to communicate via multiple RATs, such as UTRA and IEEE 802.11, as examples.

The processor 118 of the client device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the client device 102, such as on a server or a home computer (not shown).

The processor 118 may receive power from the power source 134, and may be configured to distribute and/or control the power to the other components in the client device 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, a wall outlet and the like.

The processor 118 may also be coupled to the GPS chipset 136, which may be configured to provide location information (e.g., longitude and latitude) regarding the current location of the client device 102. In addition to, or in lieu of, the information from the GPS chipset 136, the WTRU 102 may receive location information over the communication links 114/115/116/117/118 and/or determine its location based on the timing of the signals being received from two or more base stations. It will be appreciated that the client device 102 may acquire location information by way of any suitable location-determination method while remaining consistent with an embodiment. In accordance with an embodiment, the client device 102 does not comprise a GPS chipset and does not acquire location information.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Current displays that people have in their homes, despite the growing sizes, do not provide truly immersive experiences. At the moment, important limitations of VR HMDs are the limited resolution and issues with the head tracking and associated motion sickness. However, these issues are improving with newer generations of VR HMDs. Another issue with VR HMDs is the complete visual isolation they cause for the user. This isolation strictly limits the experiences spatially and socially.

VR setups including several display walls called VR-Caves have been built and used in many research institutes. Such Cave-like installations enable natural exploration of the VR environments, but at the cost of high space and equipment requirements and expenses. However, these Cave systems allow intuitive exploration of virtual content, strong immersion and even somewhat limited support for multiple concurrent users.

It would be advantageous for a user to have the ability to, depending on the content and context, change shape and behavior to support immersive virtual experiences in a 3D mode where displays are surrounding the user similar to a VR Cave, while for traditional content (such as movies) the display would provide a flat or slightly curved screen of maximum size.

To improve the usability of such a shape-changing display, the system producing the output to the display is able to automatically detect changes in the display configuration and adjust the output characteristics accordingly. Current graphics output configurations supported by operating systems are generally intended to support static display configurations, where the configuration process is conducted as a separate step. Display surfaces are only considered as 2D planes, the locations and orientations of which are defined manually by the users.

Such dynamic display behavior requires changes in the arrangement of how the display and output are managed at the operating system and software application level. This disclosure provides a solution for managing dynamically changing display configuration in real-time during the application execution.

Automatic Calibration for Dynamic Display Configurations

Embodiments described herein enable harnessing the full potential of display setups that include multiple display tiles or that are otherwise able to change the configuration and shape of the display during run-time automatically or manually. This enables richer types of content display and provides an improved user experience in view of the content and the context of use.

Figure 2:
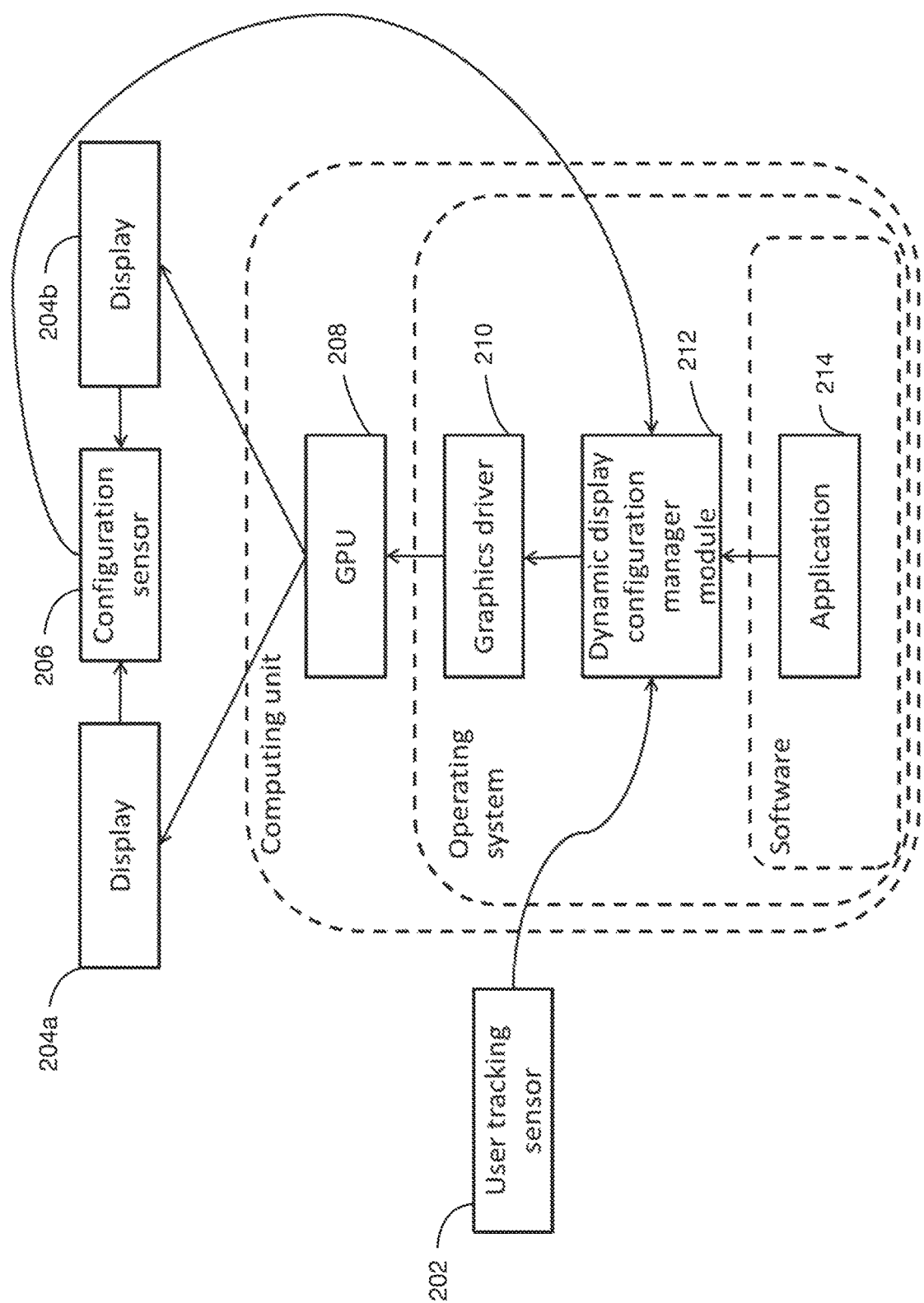
FIG. 2 depicts an overview of components for use within a system, in accordance with at least one embodiment.

FIG. 2 depicts an overview of components for use with a system configured to receive sensor based data regarding a display configuration and position of users as inputs, and based on the received inputs modify a graphic output stream produced by currently active application so that the graphics output is adjusted to match the current display configuration and context of use. As shown, FIG. 2 depicts user tracking sensor 202, displays 204*a* and 204*b*, display configuration sensor 206, graphics processing unit (GPU) 208, graphics driver 210, dynamic display configuration manager module 212, and application module 214.

Displays 204*a* and 204*b* can be television screens, computer monitors, smart phone/tablet screens, LCD displays, LED displays, or any other common display module known to those of skill in the art. In some embodiments at least one of the displays can be a flat panel. In some embodiments, at least one of the displays is a curved display. In some embodiments, at least one of the displays can be a flexible display.

User sensor tracking sensor 202 can be a camera, camera with depth sensor (RGB-D) or any other sensor which can observe the area surrounding the display and provide data which can be analyzed in order to detect and track users and estimate approximate locations of users' eyes. When there are multiple users detected to be viewing the display, a user detection and tracking module can be instructed to either use some heuristics to determine the main user, instead of user eye locations use some static predefined default eye location, or find best average eye locations that result in acceptable view location for all users.

Display configuration sensor 206 can be a simple sensor embedded with the display structure that measures the angle of joints between display elements or it can be any optical, sonic, magnetic etc. sensor capable of detecting the relative orientations and locations of the display by observing the setup from outside the mechanical construction.

In some embodiments, the process of managing the dynamic display configurations is implemented as a software module. The software module can be installed to be part of the operating system as a driver, or it can be integrated as an additional feature in the graphics driver, or it can be integrated with the actual application producing the graphics output. In the overview of the related components in FIG. 2, software module dynamic display configuration manager 212 that implements the process described below is illustrated to be an individual driver module in the operating system level.

Data from these sensors are fed into dynamic display configuration manager module 212, which implements the process with the following steps:
1. Receive sensor data from the sensors observing the display configuration.
2. Identify the current display configuration.
3. Receive sensor data from of the users in the area.
4. Detect the number of users and location of the main user eyes.
5. Solve 3D projections and transformations to be used to correctly render content to for the user location with the current display configuration.
6. Inject projections and transformation to the captured graphics call stream produced by the currently executing application.

A more detailed explanation of the process is described below.

Figure 3:
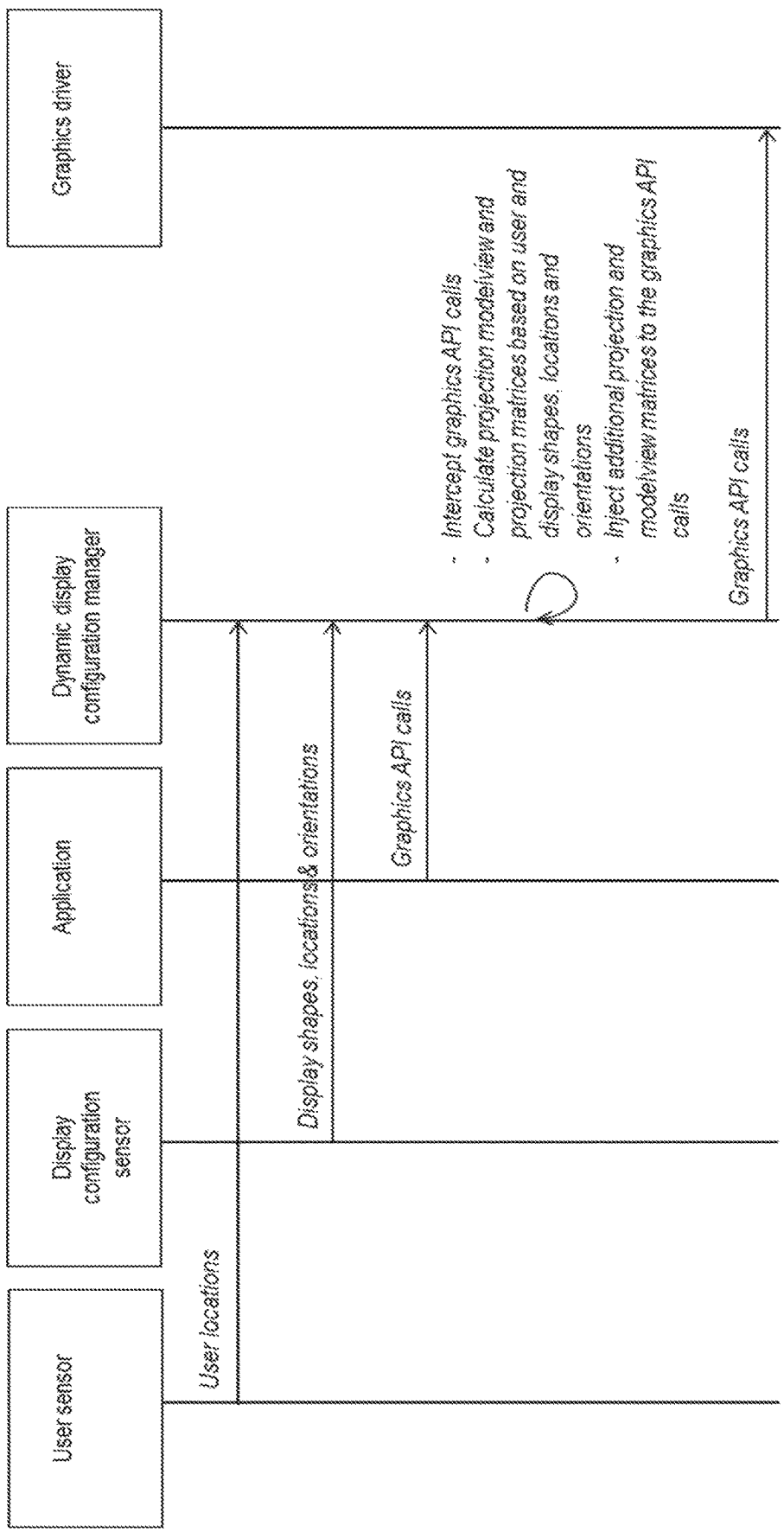
FIG. 3 depicts a flowchart of a process, in accordance with at least one embodiment.

In some embodiments, the task of this process is to take in the data from the sensors 202 and 206 observing the users and the display configuration, respectively, and modify the application 214 rendering to match display configuration, and when needed, user eye locations. This process is illustrated at a general level in FIG. 3. Based on sensor data, display configuration manager 212 can identify the shape and layout of the current display configuration, e.g., the display shapes, locations and orientations. User sensor 202 provides the display configuration manager with information on number of users and user eye locations viewing the display.

Figure 4:
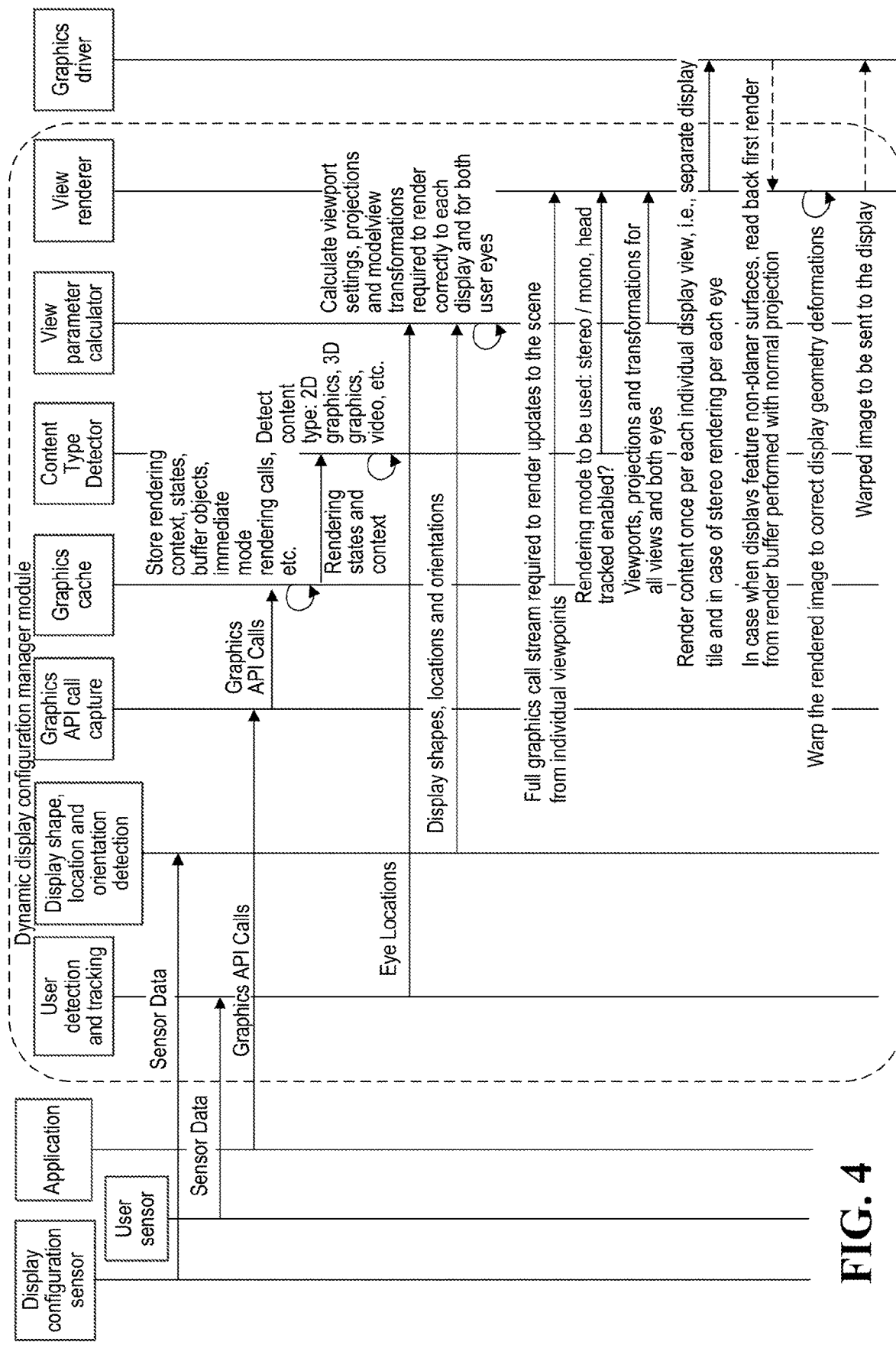
FIG. 4 depicts a flowchart of a process, in accordance with at least one embodiment.

FIG. 4 illustrates in detail one embodiment of a step of the continuous process executed by the dynamic display configuration manager 212. The first step of the process is the capture and analysis of sensor data. The process tracks information on the display shapes, locations and orientations, as well as users and locations of user eyes viewing the display. In cases when knowing relative angles between individual display elements is enough, the approach of using an angle-detecting sensor, such as electrical potentiometer, is sufficient. In cases where individual display screens can be moved with more degrees of freedom, other tracking methods such as sonic or magnetic tracking can be used.

When a camera or depth sensor (RGB-D) is used for observing the display configuration, computer vision based approaches can be used to detect changes in shape, location or orientation of each individual display element. Since the visual data sent to the displays is known, the location and orientation of displays can be detected from just RGB data with any image detection and tracking approach used for example in markerless tracking solutions proposed for AR. The shape changes of displays can also be detected from RGB data, by using for example the convex optimization approach proposed in SALZMANN, Mathieu; HARTLEY, Richard; FUA, Pascal. Convex optimization for deformable surface 3-d tracking. In: *Computer Vision, 2007. ICCV 2007. IEEE 11 th International Conference on*. IEEE, 2007. p. 1-8 (hereinafter "Salzmann et al.") or any similar method. In case of RGB-D data, the depth component included with the data can be used in combination with the RGB data to further fine tune the shape, location and orientation detection.

In addition to receiving sensor data of display configuration and location of users, the process intercepts all graphics API calls produced by a currently active application. Graphics API call interception is done by routing graphics call handling through this module for example by replacing default graphics driver shared objects with this module and plugging the output of this module to be the input for the default graphics driver shared objects. Graphics API calls interception operates with same principle as is used for example by NVidia 3D Vision and NVidia 3DTV Play modules. These NVidia modules capture all graphics API calls produced by unmodified applications, cache graphics API calls and inject modified projection and modelview matrices to the calls to enable stereoscopic rendering. Stereoscopic rendering involves the scene being rendered twice; once for each eye, with slightly different viewpoints that have an offset matching the approximate interpupillary distance of the user.

In addition to being able to intercept and modify the graphics API calls produced by the application, dynamic display configuration manager 212 can inspect the graphics API calls to identify the type of the content being displayed. The content type can be used to decide how the rendering should be modified to best fit the display configuration and use context. For example, 3D content can be transformed into an immersive rendering that takes into account user eye locations, whereas with video content, just correct clipping and transformation of clipped areas of the video for each display to produce seamless combined display area may suffice.

A view parameter calculator calculates correct viewport settings, projections and modelview transformations used to render 3D content to each display and for each different eye location. Examples of calculating projection and modelview transformation in the simple case of two non-planar displays as well as with single flexible display are given below. The same approach can be extended to calculate parameters for any number of displays with any orientations and shapes.

As a last step of the process, the view renderer renders full content individually for each display and in the case of stereoscopic rendering, twice for each individual display. In the rendering the view renderer sends view dependent viewport settings and graphics API calls with correct projection and modelviews injected to the graphics driver. Graphics driver 210 then forwards these commands to the graphics processing units (GPUs) 208 that output the graphics to the displays 204a and 204b. In case of displays with non-planar surfaces, the rendering step may require rendering of the scene twice, first rendering the whole scene to a render buffer with the normal perspective projection that covers the whole area covered by the display. Rendered image data in the render buffer is then warped to correct display geometry deformation and warped image is sent to the display.

Two Planar Displays

Figure 5A:
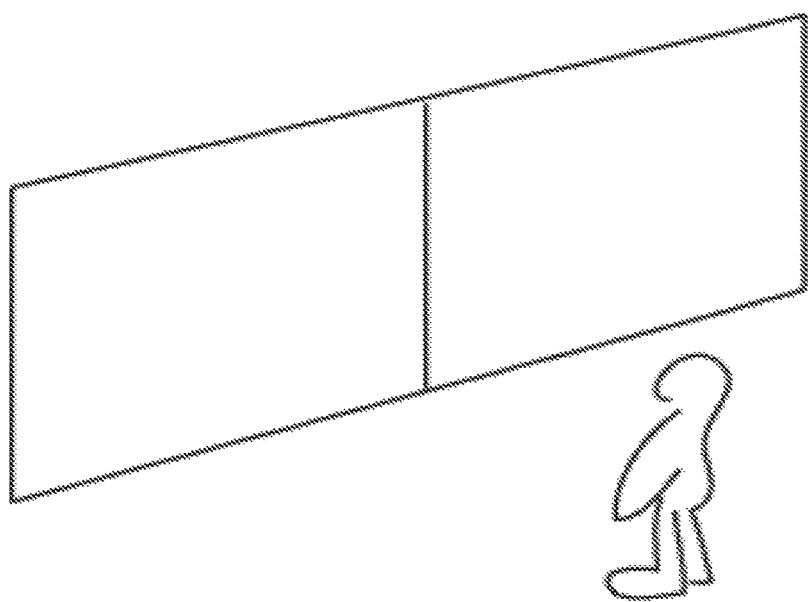
FIGS. 5A and 5B depict example configurations of two planar displays, in accordance with at least one embodiment.

In one embodiment, a user is watching display configuration composed of two displays. The angle between the two displays can be dynamically adjusted, and the joint between the displays is instrumented with a sensor sending the angle reading to dynamic display configuration manager 212. FIG. 5A illustrates the beginning situation where a user is viewing 2D graphics from the display configured to a planar mode.

Figure 6A:
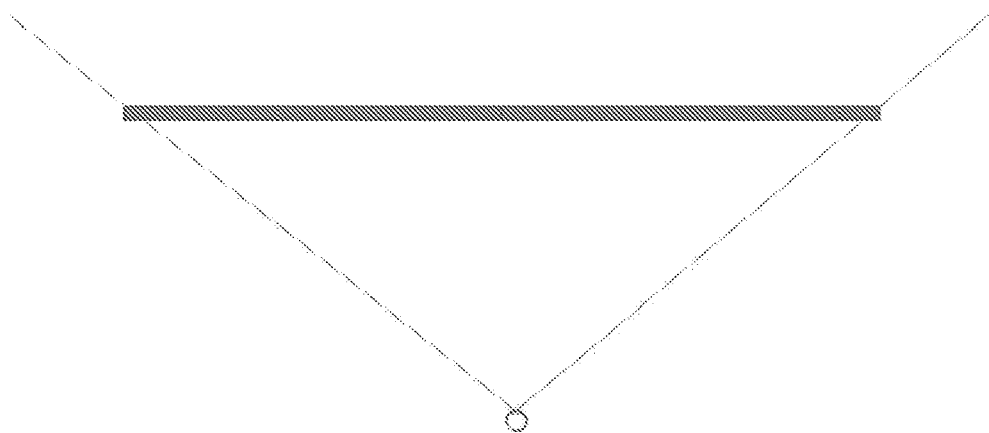
FIGS. 6A, 6B, and 6C depict various calculations of projections for two planar displays, in accordance with at least one embodiment.

FIG. 6A illustrates the projection calculated by dynamic display configuration manager for the two display monoscopic rendering when screens are in planar alignment. The user launches an application that produces 3D rendering of a virtual world. The dynamic display configuration manager identifies the change into a 3D rendering mode by inspecting the graphics API calls produced by the application and switches to an immersive output mode.

Figure 6B:
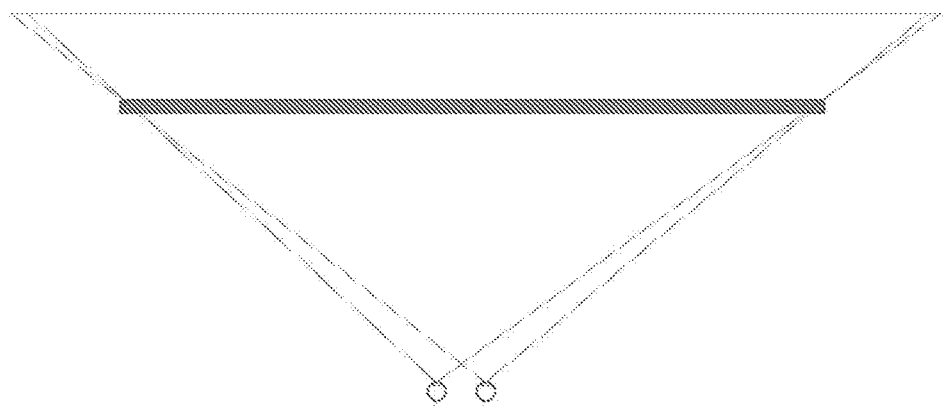

In immersive rendering mode the dynamic display configuration manager calculates projections for both of the users eyes as seen in the FIG. 6B. Eye locations are estimated based on the user sensor data, and required viewpoint transformations and projections are injected to the captured graphics API calls produced by the application.

Figure 5B:
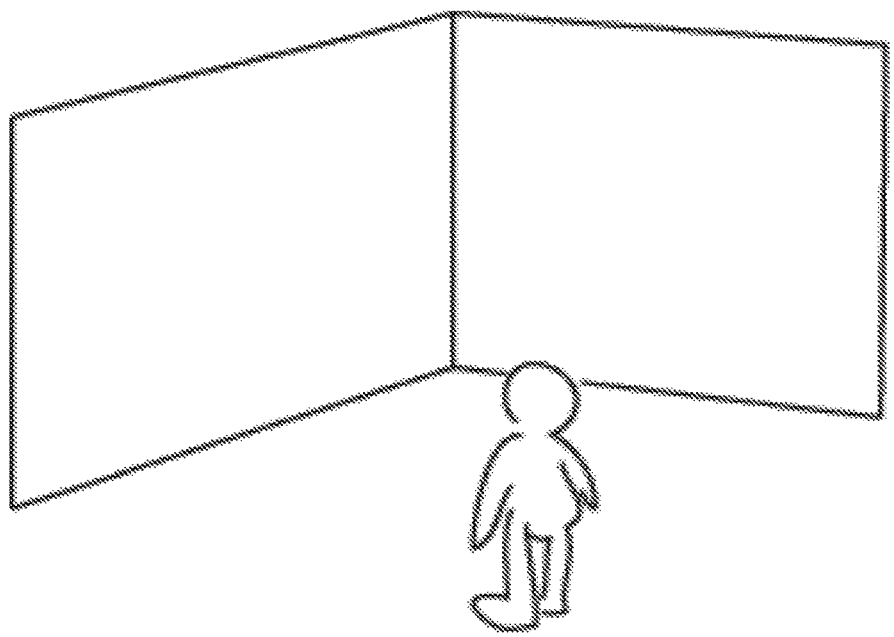
Figure 6C:
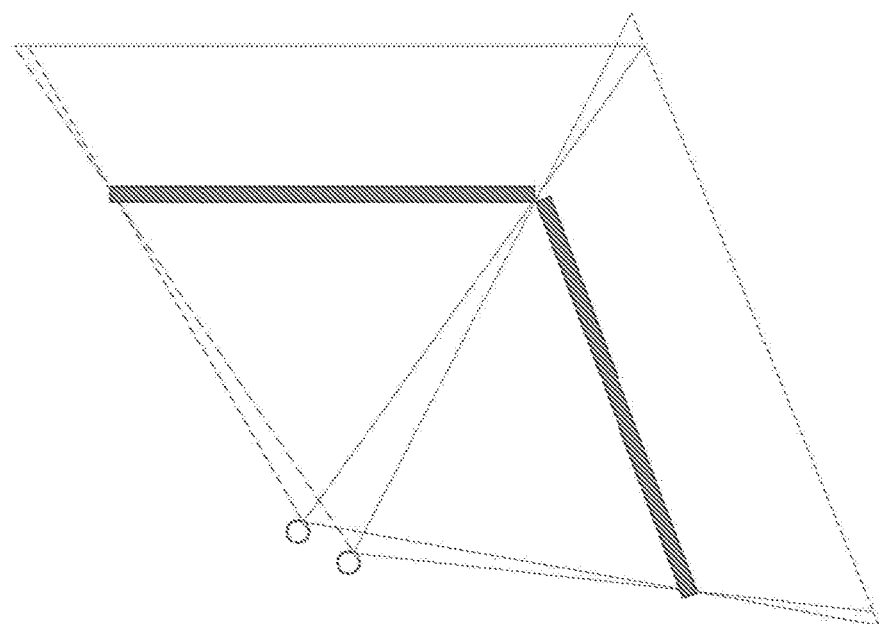

FIG. 5B illustrates the user viewing the display configuration after changing the angle between the displays. This new configuration is similar to a VR Cave display, where the user is surrounded by the display walls. In this case, the viewpoint transformations used to render both display views correctly are different. Projections used by the non-planar configuration are illustrated in the FIG. 6C.

Flexible Display

Figure 7A:
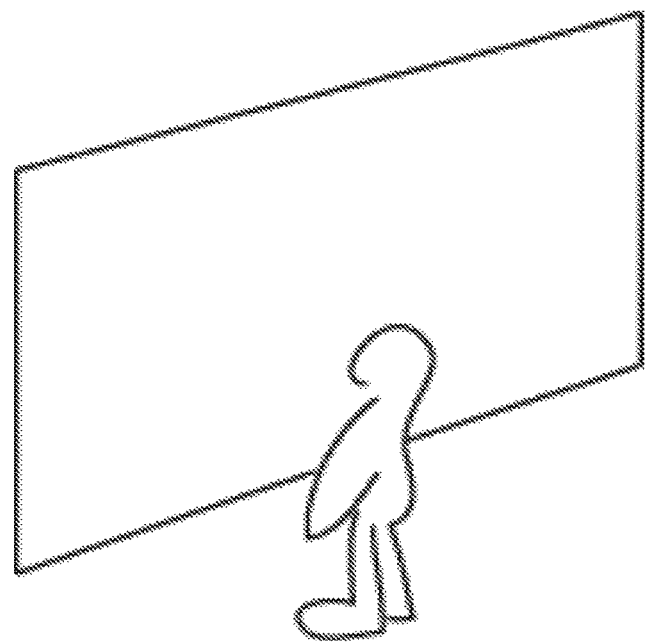
FIGS. 7A and 7B depict example configurations of a flexible display, in accordance with at least one embodiment.

In some embodiments, the output is calibrated for configurations composed of displays with non-planar display surfaces or display surfaces that can change shape, e.g., from flat to curved or non-uniform shapes that can be achieved with flexible displays. In an example embodiment, the user is viewing a flexible display which is first laid out as a planar surface on the wall as seen in FIG. 7A. Projection used for 3D rendering in this case is the same as with planar displays seen in previous example in FIG. 6A. Rendering in this case requires no extra steps and is performed by calculating projection and transformation matrix modifications based on display orientation and location and user head or eye locations received from the head tracking.

Figure 7B:
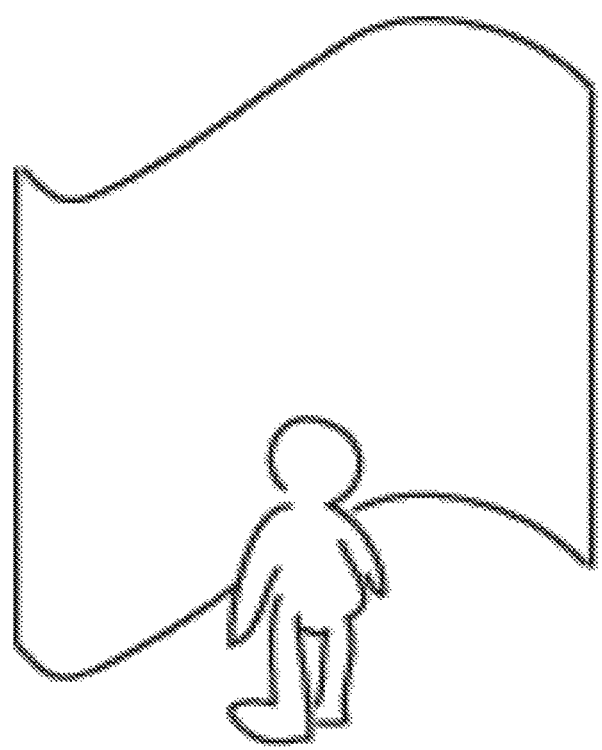

During the application run-time, the user changes the display shape by bending it to angles. The deformed display shape resulting from the user's actions is illustrated in FIG. 7B. Correct immersive rendering on the deformed display shape resulting from the display bending is not performed with mere modification of modelview and projection matrices; instead, the rendering uses additional geometry correction to compensate the image warping caused by the non-planar display surface.

Geometry correction is achieved by first detecting the new shape of the display. Display shape can be detected either with depth reconstruction assisted with optical matching in case when an RGB-D sensor is available for configuration detection, or in case of just having RGB data available, using techniques described, for example, by Salzmann et al. Optical detection of the display setup is just one option. In some embodiments, the display configuration sensor can be a simple sensor embedded with the display structure that measures the angle of joints between display elements, or it can be any optical, sonic, magnetic etc. sensor capable of detecting the relative shape, orientations and locations of the displays by observing the setup from outside the mechanical construction.

Figure 8:
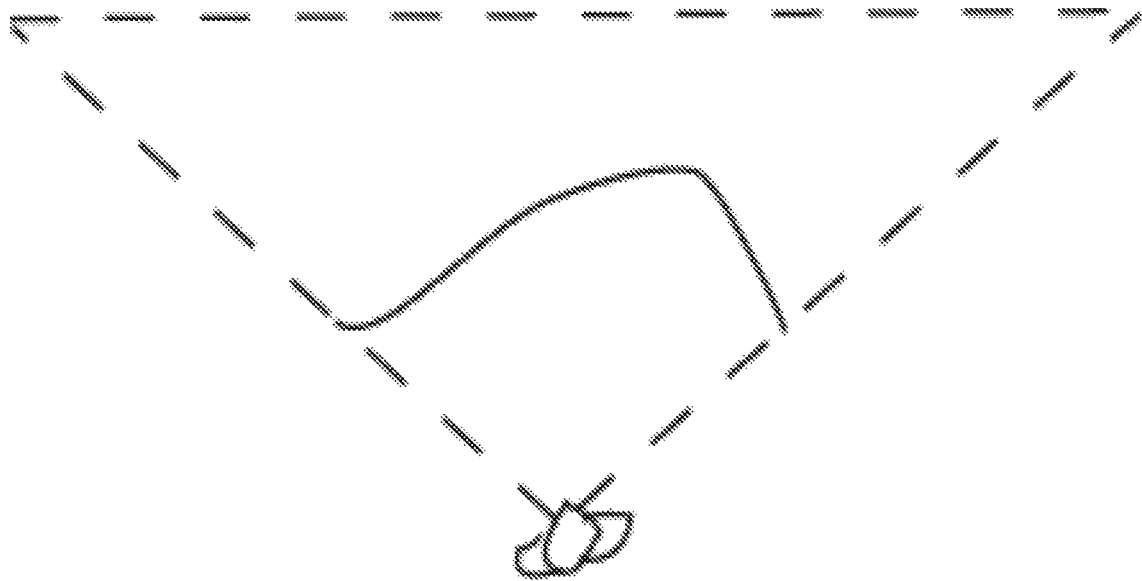
FIG. 8 depicts an example calculation of a projection of a flexible display, in accordance with at least one embodiment.

When the deformed display shape, location and orientation are determined, the area to be rendered to cover the whole area of display can be calculated. FIG. 8 illustrates how the projection that covers the whole display area looks when visualized from the top view. With a non-planar display surface, the immersive 3D rendering may be performed in two steps. In the first render pass, the scene is rendered normally using the calculated projection. This first render pass is directed to render the image into a render buffer. In the second render pass, the deformation geometry is used to define a warp of pixels from image plane coordinates resulting from first render pass to deformed display screen coordinates. This step can be thought of as texturing the deformation geometry by projecting render buffer pixels to the deformation geometry from the user's viewpoint, and then stretching the textured deformed geometry back to a planar image, which is then sent to the display. The result when displaying the warped image on the display is that the user sees the correct undistorted view of the virtual environment from his/her viewpoint.

Additional Embodiments

Several possible variations to the embodiments described above are possible for slightly different use cases. These variations are briefly discussed below.

A first possible variation is a setup in which no user tracking is included. This somewhat more limited approach provides correct rendering of the content for one single predefined viewpoint for dynamic display configuration. This approach may suffice in situations where the application handles the head tracking required to produce truly immersive rendering, or in cases where truly immersive rendering is not required, such as using the display just for video content such as outputting 360-degree video that can be extended to display configurations with displays covering large field of view but do not support changing of viewpoint based on the head tracking.

Another embodiment integrates features to actively change the display configuration in addition to just adjusting rendering to accommodate the display configuration. In such case, an exemplary process includes an additional module that is able to identify a primary display configuration based on the content type, number of users and locations of the users and then command displays to change the configuration to the detected ideal positions. This makes use in some embodiments of a motorized display setup to be used and an interface for this process to communicate with the display setups that could be used to command the display configuration to change shape as desired.

In addition to embodiments where the display configurations only change shape, the above-described process could also be used in cases where displays are appearing and disappearing dynamically in the environment. For example, in a case when using dynamic output mapping described in International Application No. PCT/US16/47370, filed Aug. 17, 2016, entitled "Systems and Methods for Enhancing Augmented Reality Experience with Dynamic Output Mapping" (hereafter [Harviainen]), displays can be found from the environment during run-time and then taken into a use for output. In such case, the display configuration sensor may be configured to cope with displays becoming available/unavailable during the run-time and to be able to detect their shape, locations and orientations. In some embodiments, this could be handled by a visual tracking of displays, as is described by [Harviainen]. Some further embodiments could be extended to also operate with displays that have a dynamic location, such as head-mounted AR displays, if the location of the display could be detected for each rendering step. This might use for example an inertial measurement unit (IMU) or visual based tracking that detects where the user is looking, e.g., where the AR screen is located, and this tracking information is integrated with the process so that correct parts of the content could be displayed on the AR HMD in combination with other displays.

As mentioned above, the module 212 may be implemented as an individual module on the operating system level or integrated as a feature on the graphics driver. In both embodiments this module can behave as a component changing the output produced by the application without the application needing to be aware of the process or by providing application required information to produce correct rendering by itself. The process has been described above in a mode where the application 214 is unaware of the dynamic display rendering. However, in some embodiments the module 212 might collaborate with the application so that the application 214 would be aware of the dynamic display configuration manager and can control the rendering. When immersive rendering is required, application 214 could request the current display configuration and associated rendering settings and then control the rendering by choosing how to apply this information and stream graphics API calls directly to the default graphics driver. This way application 214 has more control over the rendering and can for example choose the best way of rendering UI elements depending on what kind of display configuration is currently in use.

Outputting Immersive Content on Display Combinations

Use of AR HMDs in combination with traditional display technologies (e.g., display screens and projectors), enables new ways of outputting immersive real-time 3D graphics. Some embodiments may incorporate any of the following features added to the normal 3D graphics output when using this invented method. In some embodiments, head tracking enables immersive rendering with motion parallax on traditional displays. In some embodiments, stereoscopic viewing is incorporated. Displays with high enough frame rates use active stereo mode when coupled to AR HMDs that can block the view and therefore act as active shutter glasses in addition to being a display device. In some embodiments, traditional displays are extended by rendering areas outside the traditional display on the display of the AR HMD. In some embodiments, shadows cast by the viewer or by objects onto the display screen (e.g., when using a front projection display) may be detected, and corresponding content (e.g. content blocked or occluded by such shadows) may be displayed on the display of the AR HMD. In some embodiments, object occlusions caused by objects between viewer and display may be detected, and corresponding content (e.g. content blocked or distorted by the intervening objects) may be displayed on the display of the AR HMD. In some embodiments, the AR HMD may provide a better match for natural eye accommodation by splitting the content (i.e., virtual elements may be displayed on the display that is closest to the correct eye accommodation distance).

Combining the advantages of AR HMDs with the advantages of the traditional displays not only enables improvement on the viewing experience, but also enables completely new ways of harnessing traditional display for consuming immersive content.

In accordance with at least one embodiment, a method combines several approaches that maximize the immersion that can be created with a combination of optical see-through AR HMD and traditional display devices. In some embodiments, the method executes a process comprising the following steps:

As a pre-processing step, the method may perform the following steps:
1. Connect to external display devices available in the environment with a streaming protocol.
2. Create render buffers for each display and choose if and what stereo mode to use. When using stereoscopic rendering, create two render buffers for each display (one buffer for each eye). When displays in the environment support active stereo, the AR HMD may be used to block the view, e.g. operate as a shutter glass, synchronize rendering/blocking of view of each eye on the AR HMD with the environment displays.

Per each render step, the method may perform the following steps:
1. Split content into parts displayed on the AR HMD or on the connected external displays.
2. Track the users head location, and calculate additional modelview, projection and viewport transformations used to render the virtual environment as seen from the user's point of view on the external display devices in the environment.
3. Render images to be displayed on each external display in the environment and stream the images to the displays. Mask out areas of the images where overlap occurs between the external displays and the AR HMD. This masking minimizes color bleeding from the external displays to the AR HMD display.
4. Inspect the displayed images on external displays with the AR HMD camera to detect artifacts caused by object occlusions, and render missing portions due to occlusions or portions with artifacts on the AR HMD.
5. Render areas which are outside the surface areas of external displays on the AR HMD.
6. Render elements chosen to be displayed on the AR HMD.
7. In the case of active stereo, repeat the process using the other eye's transformation, and switch the eye that is being blocked with the AR HMD.

In some embodiments, the AR HMD connects to output display devices in the environment. The AR HMD device may connect to the output display devices present in the environment using various available techniques. In some embodiments, the AR HMD may automatically poll for output display devices in the environment, and connect to any detected output display devices. In some embodiments, a user may be presented with a list of available output display devices, and the user may select one or more output display devices in which to connect. The actual connection between output display devices and the AR HMD may be formed using any connection protocol, such as Bluetooth, Apple Airplay, Miracast, Chromecast, or any other known methods of wirelessly displaying content on an external display device.

In some embodiments, the AR HMD may use sensors to construct a virtual model of the environment and output devices. The AR HMD may poll for available output devices (using a wireless networking technique such as WiFi or Bluetooth, for example), and may connect to any detected output devices. A test signal generator in the AR HMD may construct test signals and content signals, and send them to the connected output devices. The output of the connected output devices may be observed using a camera embedded on the AR HMD, and for each connected output device, a determination module may be configured to drop any output devices that do not produce desirable results.

In some embodiments, in addition to finding and connecting to displays available in the environment, a 'virtual environment model' may be constructed. A 'virtual environment model' is a model that describes the environment structure, and maps output device locations in the environment and also output device characteristics. The virtual environment model may be used in the run-time steps of this process for tracking the user's movement in the environment and also to track the locations of the external displays in relation to the user (or in relation to user's eyes, in some embodiments). In some embodiments, the virtual environment model may be updated in real time to reflect user movement, and the virtual environment model may be used in calculating view transformations to apply to the original 3D content. In some embodiments, calculating the virtual environment model includes using one or more RGB-D sensors, cameras, depth sensors, or any combination thereof to determine relative location of objects and displays in the users environment. In some embodiments, the sensor/camera placement on the AR HMD is known in relation to the user's eyes (perhaps during some calibration process). In some embodiments, object and display distance may be determined by comparing images captured by cameras on the AR HMD. In some embodiments, orientations of the displays may be determined by analyzing known images sent to detected external displays in the environment.

In some embodiments, the next step in the process is to create render buffers for each connected external display device. In embodiments utilizing stereoscopic rendering, the process may generate two render buffers for each connected display; one buffer for each eye. Stereoscopic images on the connected display may be generated using active stereo imaging, e.g., active filtering, if supported by the AR HMD and displays. In some embodiments, the external displays may support auto-stereoscopic imaging, e.g., are fitted with lenticular lenses or similar beam splitter technology automatically splitting the images for users eyes. For active stereo, the AR HMD may be configurable to block the view of each eye at high rate in synchronization with the display switching between the views of the different eyes sequentially. In embodiments utilizing active stereo viewing, the AR HMD may block the view of the eye in which the content is not currently being rendered, e.g., the process may alternate between rendering content for a first eye while blocking a second eye, and blocking the first eye while rendering content for the second eye.

For each render buffer, the 3D content is split among the connected external display devices and the AR HMD. In order to split the 3D content to the external display devices and to render the content correctly, the processing module may intercept 3D graphics API calls originally created by another application. Intercepting the graphics API calls allows the process to analyze and modify the 3D content without any further modifications to the application originally producing the 3D content.

In some embodiments, the virtual environment responds naturally to user movement to create the illusion of the user being present in a virtual environment. User head-tracking may enhance the feeling of immersion such that virtual elements in the virtual world may react to movement of the users head in a natural way, e.g., allowing user to inspect elements by moving around the objects as if the user were looking at a real object in the physical environment. Motion parallax is the phenomenon that enables this feeling of immersion, meaning that objects move in a natural way when the user moves his/her head. In some embodiments, the process executes tracking based on the camera or RGB-D data captured from a sensor (e.g., gyroscopic sensor, infrared (IR) sensor, or various other types and/or combinations of sensors) embedded in the AR HMD. Based on sensor data detecting head tracking, the process calculates how the modelview matrix, projection matrix and/or viewport of the original application should be changed in order to render the virtual environment correctly on the external displays as seen from the new viewpoint of the user. In some embodiments, view transformations are calculated based on sensor data representing display shape, location, and orientation. In order to calculate the view transformations, the process may receive spatial relations between the users eye locations and displays in the environment, from the virtual environment model described above. OpenGL offers various functions that may be used to calculate view transformation matrices, such as the modelview matrix, projection matrix, and viewport settings mentioned above. In some embodiments, some of these functions may accept processed sensor data while updating existing transformation matrices, settings, etc. In some embodiments, an initialization process may determine a first transformation matrix, using cameras to compare captured images. In further embodiments, the first transformation matrix may be continuously updated based on user/head-tracking sensor data to provide natural motion parallax from the user's viewpoint.

Figure 12:
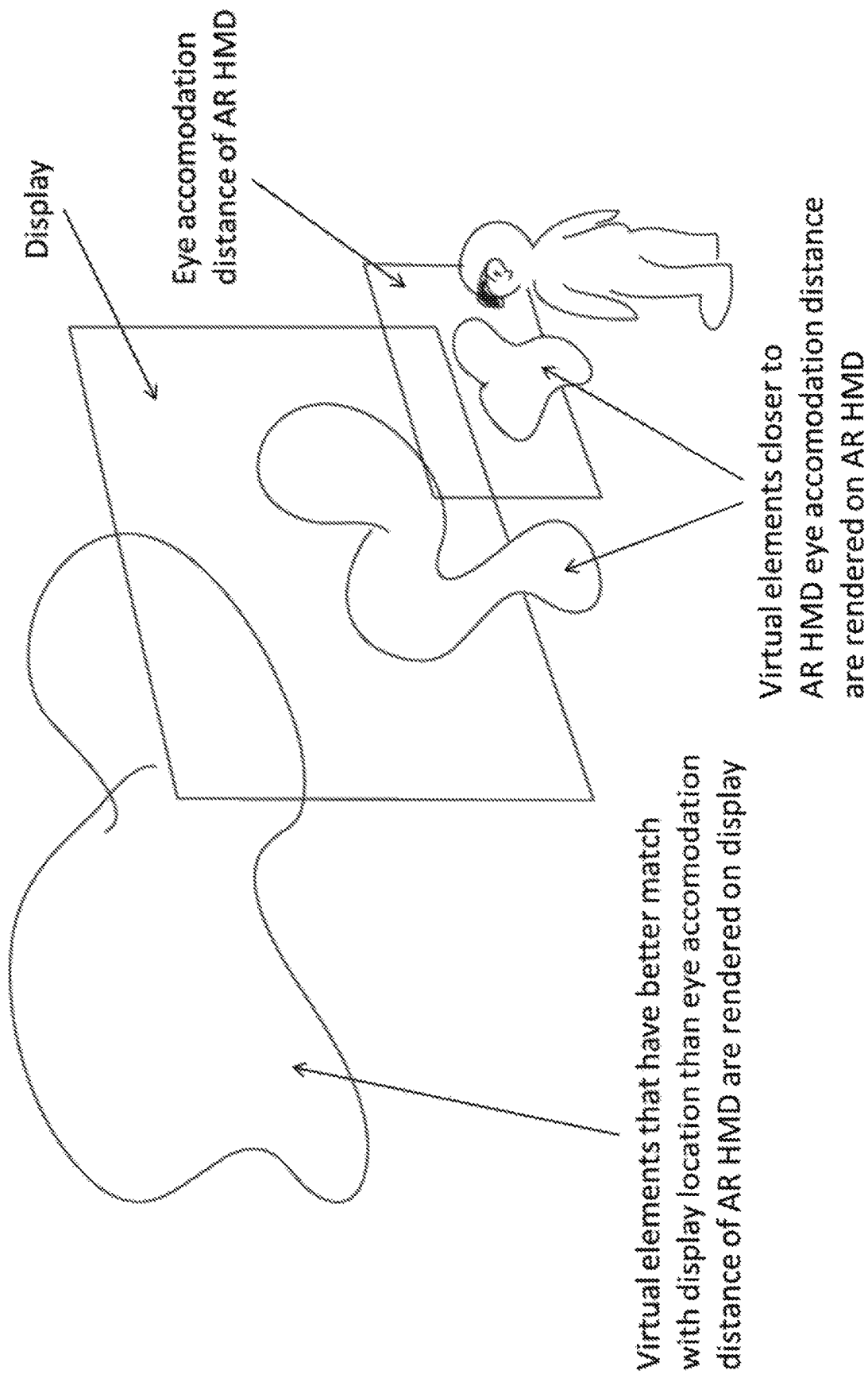
FIG. 12 depicts an example of assigning virtual elements according to eye accommodation distance, in accordance with some embodiments.

Once the 3D content has been intercepted, the process splits up the content by choosing parts of the content to display on external display devices, and parts of the content to display on the AR HMD. The goal of this step is to divide the content into (i) elements to be displayed on the available external displays in the environment and (ii) elements to be displayed on the AR HMD so that natural eye accommodation distance of the AR HMD display matches the distance from the user to the external display devices, minimizing the error between virtual element distance and the natural eye focus required to watch the external display devices. For each selected element, this can be done by first determining the virtual distance of the virtual 3D element, and comparing that distance to (i) the eye accommodation distance of each available external display device and (ii) the natural eye accommodation distance of the AR HMD, and selecting a display (external or AR HMD) with the best match of eye accommodation distance for an element with the given virtual element distance. FIG. 12 depicts an example of selectively rendering virtual content on the AR HMD and on external display devices in order to provide most natural eye accommodation for virtual content viewing. As shown, virtual elements that have a better virtual distance match with display location are rendered on the external display device. On the other hand, virtual elements closer to the AR HMD eye accommodation distance are rendered using the AR HMD. Various techniques may be used to determine which display is the best match for which virtual distance. For example, the best match may be determined using ratios, with the best match being the match for which the ratio of display distance to virtual distance is closest to one. The best match may also be determined based on, for example, a match function $m(d_d, d_v)$ of display distance $d_d$ and virtual distance $d_v$, with the display being selected so as to maximize the value of the match function m( ). The match function m( ) may be determined empirically based on, e.g., user feedback regarding comfort and/or realism levels of virtual objects at different virtual distances on displays at different physical distances.

In some embodiments, an exemplary method of splitting data between external displays and the AR HMD includes determining, for each a plurality of virtual objects, virtual distances at which the object is to appear from the user's perspective. Objects that are to appear at virtual distances within an acceptable range of the user's AR HMD may be rendered on the AR HMD. Objects that are to appear at virtual distances greater than the maximum acceptable distance that can be rendered on a users AR HMD are rendered on an external display, wherein the external display has an actual distance from the user that is greater than the maximum acceptable distance.

Figure 9:
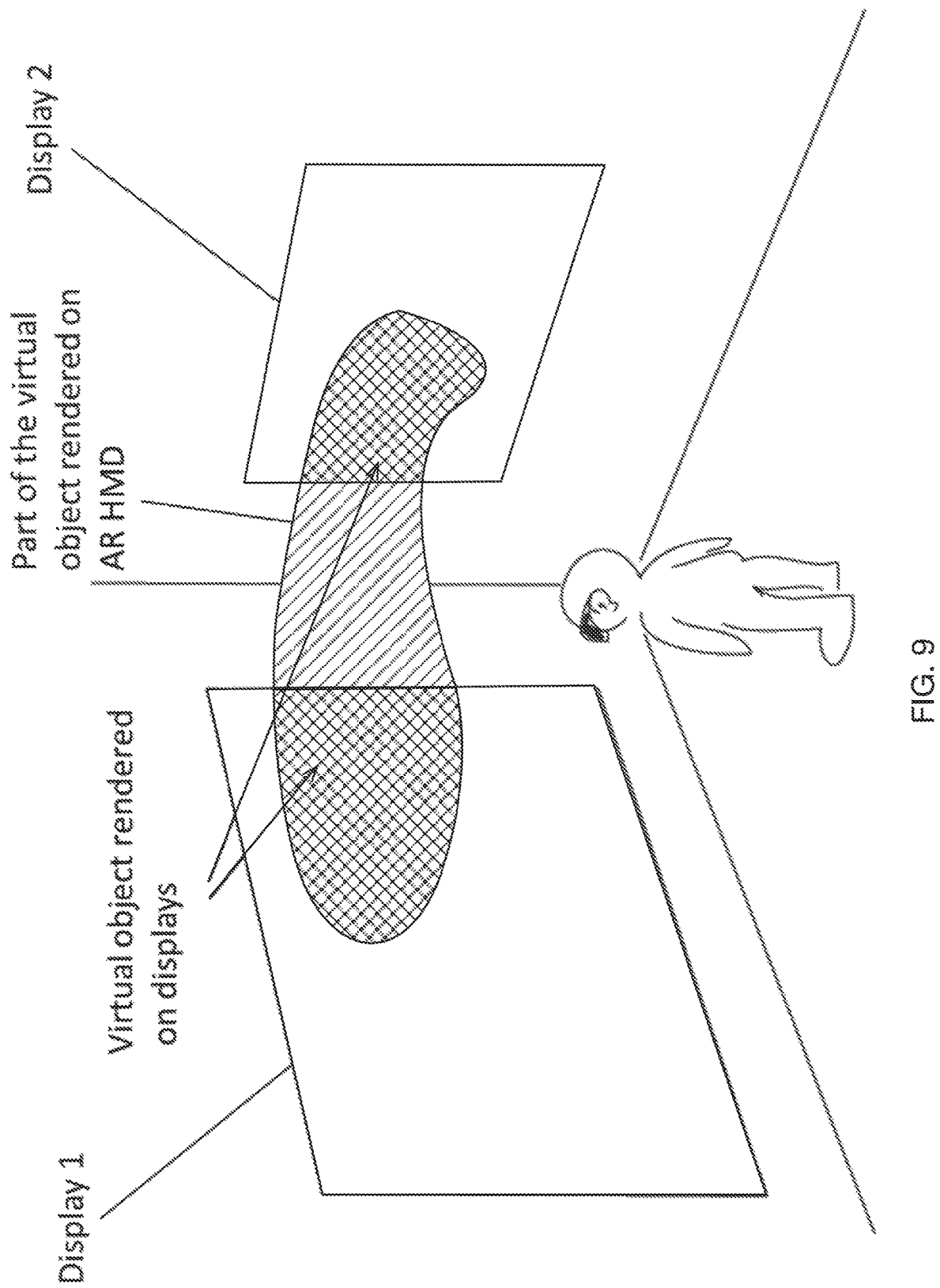
FIG. 9 depicts a user in an immersive environment including two external display devices, in accordance with some embodiments.

FIG. 9 depicts a user using an AR HMD in a room with two external display devices. As shown, content has been split between display 1 and display 2, while the AR HMD renders a portion of the content in between the displays. In some embodiments, the process provides a first portion of a video presentation on a first external display and a second portion of the video presentation on a second external display and displays a third portion of the video presentation on the AR HMD, wherein the third portion is displayed in a space between the first and second external displays. In some embodiments, the virtual environment model may be used in determining what content to display on the external display devices versus what content to display on the AR HMD. For example, if the system knows the physical location, orientation and shape of the external displays, as well as the aspect ratio and desired size of the video presentation to be displayed, the process may calculate how much of the video presentation (as well as what portion) needs to be displayed on the first and second external displays, and then renders the rest of the video presentation on the AR HMD. In some embodiments, the cameras and/or sensors on the AR HMD may analyze the displayed portions on the first and second displays and use that information to determine the gap in between the displays that needs to be filled in with the third portion.

The next step in the process is to provide the 3D content for each external display to the dedicated render buffers. The render buffers render the 3D content by applying modelview transformation, projection and viewport settings into the 3D graphics API calls originally produced by the default graphics application. Applying the transformations changes the viewpoint and projection of the original 3D content to compensate for the viewpoint as seen from the user towards the external display.

Figure 14:
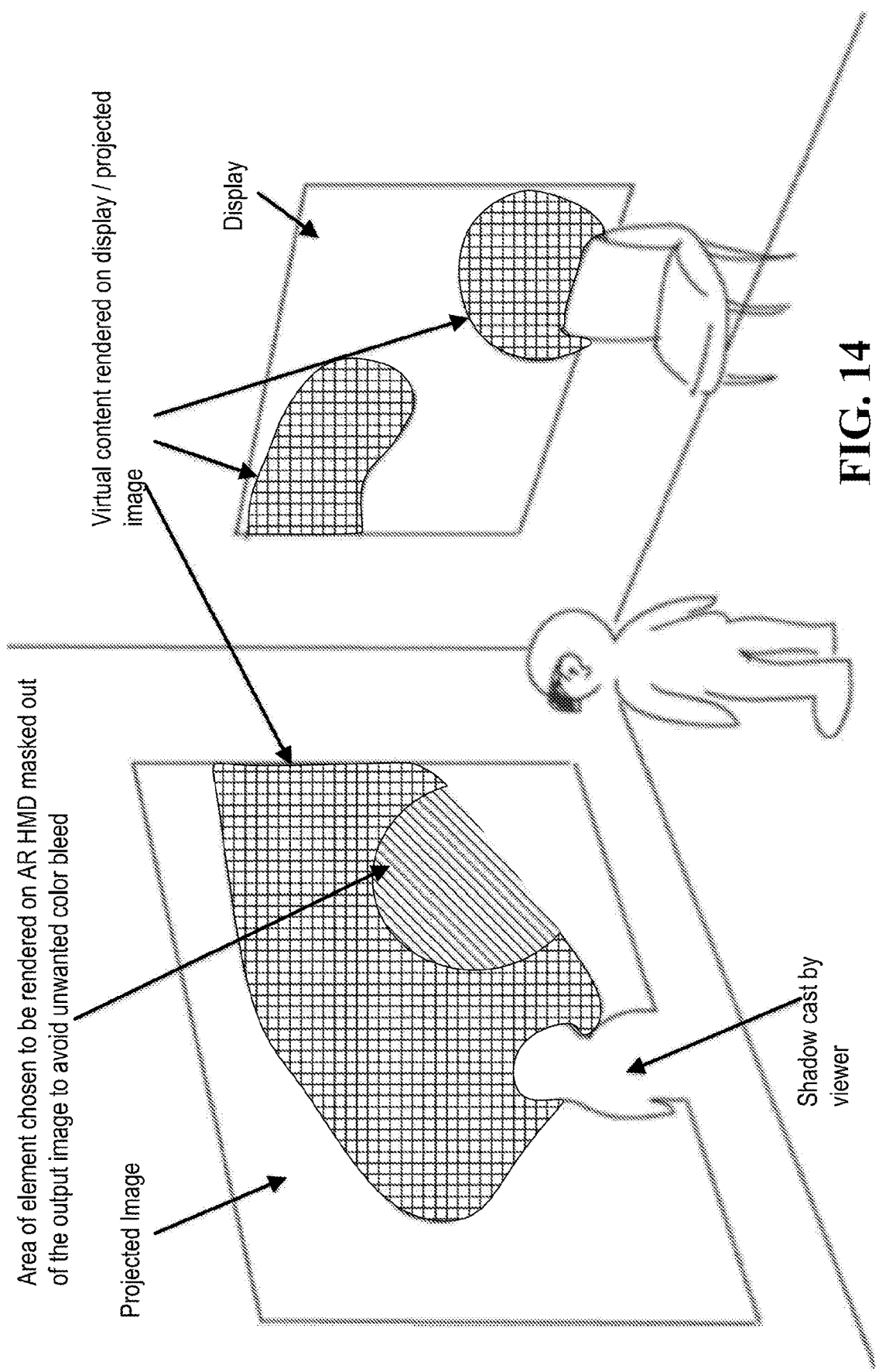
FIG. 14 depicts an example of detecting artifacts, in accordance with some embodiments.
Figure 17:
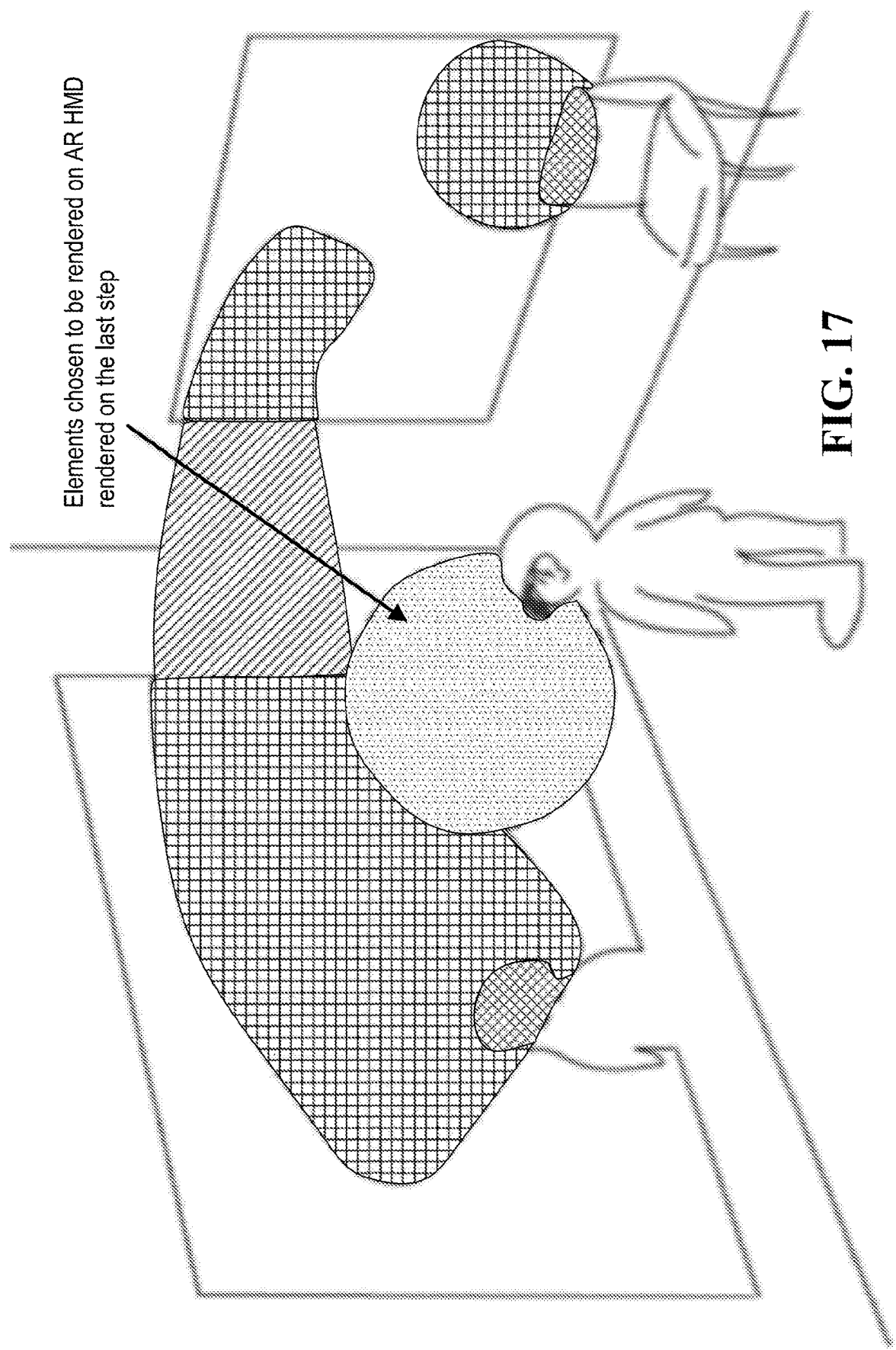
FIG. 17 depicts an example of rendering a virtual element selected to be displayed on the AR HMD, in accordance with some embodiments.

Once the selected display elements have been rendered by the rendering buffer, overlapping areas between the external display device and AR HMD may be masked out to avoid unwanted color bleeding from the external display to the image shown on the AR HMD. In some embodiments, masking is done by projecting elements to be rendered on the AR HMD to the external display image plane and then replacing that area of the image plane, e.g., rendering the area of the buffer with a mask color, such as black. In some embodiments, the virtual environment model may be used to determine potential areas that may be masked out by virtual objects displayed on the AR HMD. FIG. 14 depicts an example of masking out a portion of the first external display, and FIG. 17 depicts the object rendered on the AR HMD that is displayed over the masked out area. When areas of the render buffer overlapping with the elements to be rendered on the AR HMD have been masked out, the image buffers may be streamed to the external display devices for output.

Figure 10:
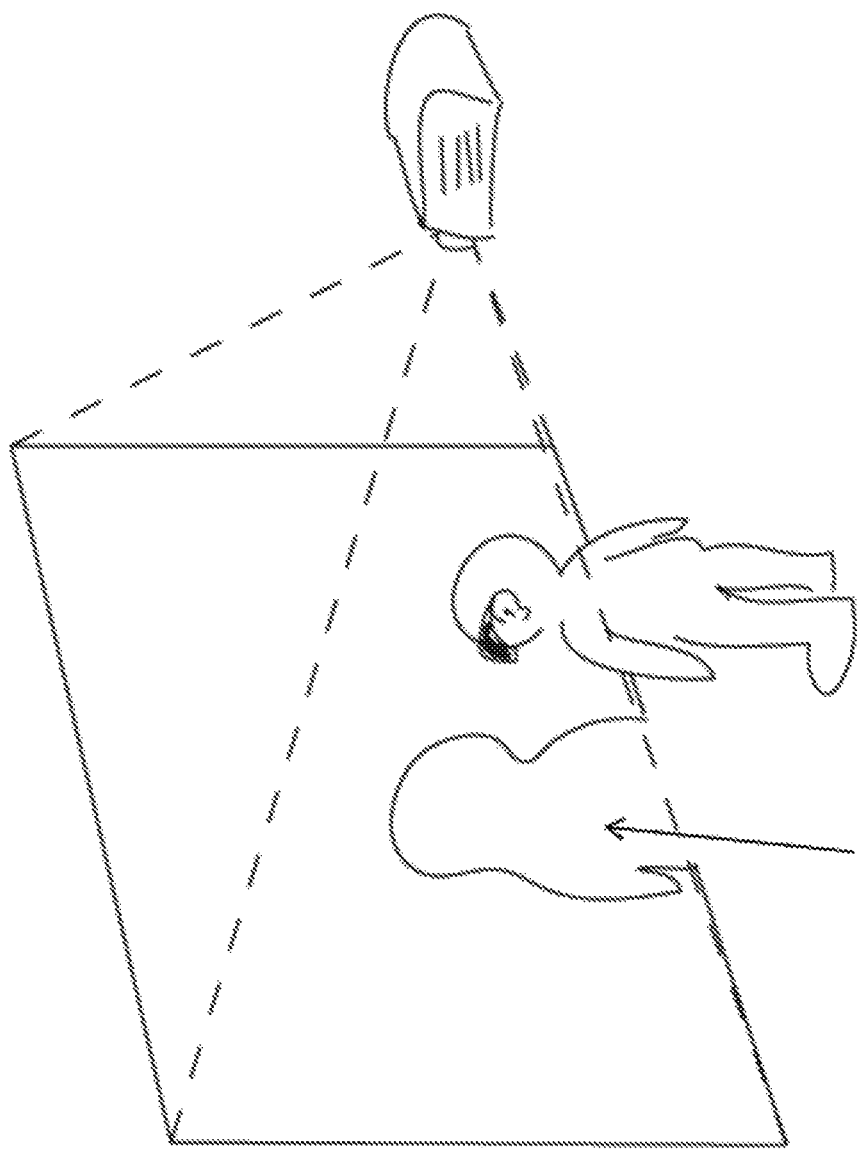
FIG. 10 depicts an example of shadow correction, in accordance with some embodiments.
Figure 11:
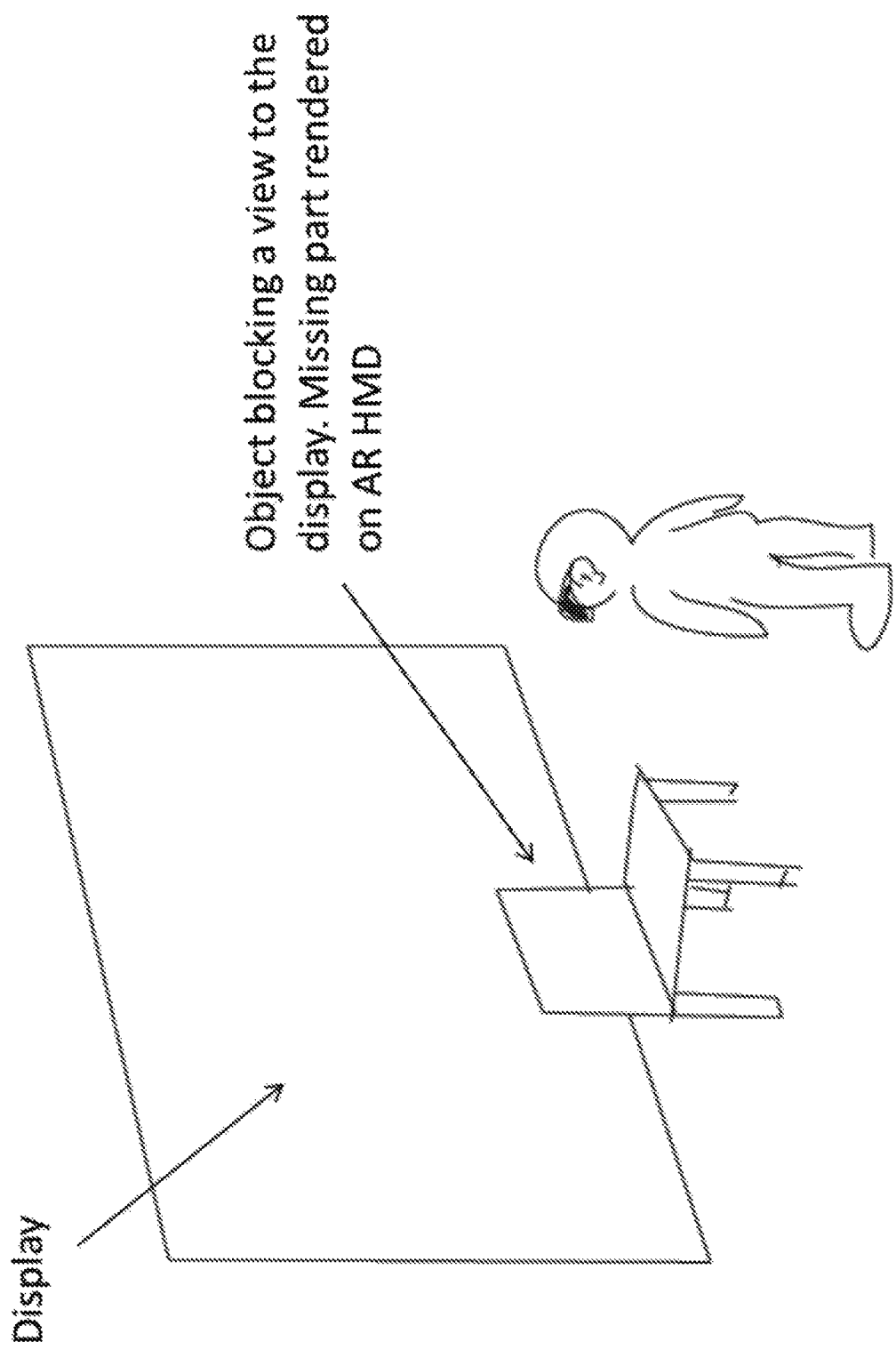
FIG. 11 depicts an example of occlusion correction, in accordance with some embodiments.

After the render buffers have been streamed to the external displays, the AR HMD inspects the output of each external display by analyzing images captured using a camera sensor on the AR HMD. Unwanted anomalies (e.g., artifacts) may be detected by analyzing the camera view of the external displays. In some embodiments, the captured camera views of the external displays are compared to a (possibly transformed) version of the original data. In some embodiments, artifacts may be detected if a portion of the content is missing in the captured camera views, which may indicate (i) an occluding object is present and (ii) the location of the occlusion area. Examples of such occlusion areas may be shadows and occluded areas on the displays behind objects due to the objects residing between the viewer and the displays or between a projector and the projected area. In some embodiments, the artifacts/occluded portions of the image may be rendered on the AR HMD in order to fix the erroneous areas in the output image. FIG. 10 depicts an example of a user wearing an AR HMD in a room with a projector. As shown, a shadow is cast on a screen due to the user standing between the screen and the projector. In some embodiments, the AR HMD is configured to detect, using front facing cameras, the region of the screen that is covered by the users shadow and to render a portion of the video on the AR HMD on the region of the screen covered by the user's shadow. FIG. 11 depicts an example of occlusion, where an object (depicted as a chair) blocks a part of the users view of the display. In some embodiments, the AR HMD may be configured to detect such an occlusion, and may render the blocked portion on the AR HMD.

In some embodiments, the system may be aware of the image buffer data sent to each external display in use, and artifacts in the expected output of the display may be detected by comparing the actual display output to the original image buffer sent to the external display device. This may be achieved in some embodiments by capturing the image from the camera sensor embedded with the AR HMD, applying a view transformation to the original image buffer data according to the user tracking data, and then comparing the output of the display device in the image captured by an AR HMD camera to the transformed image buffer data. Areas of the captured image that are significantly different than those of the transformed image buffer data may be considered to be artifacts in the output of the external display device (e.g., a shadow or occlusion caused by an object in the environment). In some embodiments, areas affected by artifacts may be corrected by isolating the artifact area in the transformed output image buffer and displaying the transformed output image buffer using the AR HMD.

As shadow and occlusion artifacts need to be detected from the display output prior to correcting them, latency issues may be periodically visible to the user. When an artifact is first detected from the output of the display, there may be an initial lag from detection to fixing it. In some embodiments, the lag depends on the performance of the AR HMD camera capture, artifact detection, and transfer and output of the corrected image buffer data that is rendered on the AR HMD. Delay between artifact detection and correction may be minimized with efficient computing performance, use of a high frame rate camera and memory bandwidth optimization. Furthermore, as real-time rendering on various display devices, including AR HMD, can be expected to be well above 20 Hz, artifacts in the display output caused by object occlusions and shadows may be expected to have relatively low spatial disparity between consecutive output frames. Therefore, once an artifact area is detected, it is possible to improve the artifact correction by assuming that the artifact area remains the same from the previous frame when rendering next frame, so that the expected anomaly areas are automatically rendered on AR HMD. Changes in artifact areas can be detected similar to when first detecting them, however the updated artifact area is used for the following frames. With this approach, the artifact and anomaly areas visible to the user can be minimized. In some embodiments, more sophisticated approaches for estimating how the artifact area is going to change from frame to frame. This could be achieved for example using something like Kalman filtering to model and estimate the motions of the anomaly areas.

In some embodiments, a method includes the steps of receiving information regarding a plurality of objects to be rendered into an augmented reality experience, wherein the objects are to be rendered so as to appear at locations of varying distance from the user's augmented environment position, determining a range of virtual distances of objects from the users augmented environment position to be rendered using a head-mounted display (HMD) worn by the user, and rendering of objects of the plurality of objects to be rendered into an augmented reality experience within the range of distances of objects from the user's augmented environment position to be rendered the HMD using the HMD, rendering at least some objects of the plurality of objects further than a maximum distance of the range of distances of objects from the users augmented environment position to be rendered using the HMD, using a display that is an actual distance from the user's real-world position, the actual distance exceeding the maximum distance of the range of distances of objects from the users augmented environment position to be rendered using the HMD, and rendering a portion of some objects of the plurality of objects that are occluded, poorly rendered, or adulterated on the users HMD to improve the quality and completeness of the experience in totality.

In some embodiments, depth data from an RGB-D sensor may be used to predict occlusions caused by objects in the environment when the AR HMD features an RGB-D sensor. In some embodiments, it is possible to model object geometry and estimate object location (e.g., virtual environment model) so that the occlusions caused by the object can be estimated without first observing the display output.

In some embodiments, virtual elements in areas not covered by external displays are rendered on the AR HMD. In such embodiments, the AR HMD may be used to extend the overall display area. In some embodiments, content is rendered on the AR HMD for the areas that are in the field of view of the user wearing the AR HMD but that have no available external display surface area. Although the image quality may not match that of external displays, this approach helps to improve how the user perceives virtual world, and act as a bridge between separate external displays together creating a better sense of immersion. In some embodiments, the AR HMD may bridge a gap of space in between two or more external displays, as shown in FIG. 9, or it may simply enlarge the effective display area of one or more displays. Such embodiments may use a virtual environment model and image analysis techniques in determining what content may be displayed on the AR HMD as well as where on the AR HMD to display the content. In some embodiments, knowing the physical distance at which the gap between the displays is from the user along with how large and what the virtual distance of the content is to appear, the process may generate a stereoscopic output using eye parallax that will result in an accurate representation of the 3D content.

In some embodiments, while using stereoscopic output, the rendering process described in the above paragraphs may be done for a first eye, then repeated for a second eye. In some embodiments, the AR HMD also blocks the eye for which the rendering process is not currently being performed.

In some embodiments, AR HMDs that can block the view, e.g., using a liquid crystal display layer or a similar device that is configurable to switch display pixels between opaque and transparent state, and can switch at high enough frame rate, can act as active shutter glasses in addition to being an AR display device. Furthermore, the AR HMD may be configurable to synchronize the blocking of the view, e.g., by adjusting the shutter frame rate to synchronize with the display in order to correctly support 3D stereo output of the active stereo display. In some embodiments, active stereo displays provide timing signal for the shutter glasses via a wired signal, or wirelessly by either an infrared or radio frequency (e.g., Bluetooth, DLP link) transmitter. To enable correct synchronization, AR HMD may either detect the timing signal provided by the display or detect the eye switching frequency by other means.

In some embodiments, the AR HMD detects an infrared (IR) synchronization signal using an IR camera. Many AR HMDs have IR cameras to enable 3D tracking, and may also be used to detect a synchronization signal. For example, an RGBD sensor provided on an AR HMD may have an RGB camera that is sensitive to the infrared light or a separate camera operating in the infrared range.

In some embodiments, AR HMDs feature Bluetooth connectivity. Thus, hardware that is configurable for capturing a synchronization signal in the Bluetooth frequency range (often around 2.4 GHz) is often already embedded in AR HMDs.

In addition to detection of the synchronization signal, an AR HMD with a camera operating at high enough framerates may detect the switching frequency of the active stereo displays by analyzing the video frames captured from the AR HMD camera looking at the active stereo displays. Such embodiments enable the AR HMD to synchronize shutter operation with any active stereo displays using any synchronization signal transmission technique.

Detection of eye view switching frequency by analyzing video frames captured from the AR HMD camera looking at the active stereo display can be broken down into a plurality of steps used to synchronize AR HMD shutter functionality.

In some embodiments, the system may not be provided with information indicating whether a display is outputting in active stereo mode. The system may detect whether a display is outputting in active stereo mode or not. If a display with active stereo output is detected, the next step is to detect the frequency and timing used by the display to switch between left/right eye views.

In some embodiments, the system may be aware of the media being displayed and be able to determine the eye order (i.e., which image is for the left and which for the right eye) of the active stereo output by comparing images output by the external display device with the media content. However, in some embodiments the system may not always have access to the media content. In such embodiments, the system may perform additional contextual analysis to determine the correct eye order. In some embodiments, the system may compare occlusions that occur between content elements. In some embodiments, the system may operate to recognize known objects (human face, body, etc.) in the images output by the external display. If known objects are detected, knowledge of such object geometry can help the system to determine which image order produces more correct depth cues. In some embodiments, less heuristic methods of using neural networks trained with large number of samples to detect correct left/right eye order are used to estimate correct eye order.

In some embodiments, in order to solve the sub-problems listed above, captured display images need to be stored and analyzed as a time-stamped time series of observations. One example process includes (i) detecting whether a display is outputting in active stereo mode and (ii) setting synchronization if active stereo output is detected.

Using AR HMDs as shutter glasses together with active stereo displays provides several advantages. A first advantage is ease of use with various types of content. In some embodiments, an AR HMD displays AR content in the environment and when needed, switches to act as active shutter glasses. There is no need to use several different glasses or to switch glasses depending on what type of content is being consumed.

AR HMD can detect and track active stereo display surface area by analyzing the images captured from the sensors embedded with the AR HMD. This enables AR HMD only to block the part of the user's view that overlaps with the active stereo display image when active stereo display is displaying stereo content. This reduces the flickering of the view as only part of the image flickers in high frame-rate. This also reduces the loss of light received by the user's eyes, as only the part of the view overlapping with the display is shut out contrary to the current active shutter glasses, which effectively block the whole view area of one eye at a time. In some embodiments, the AR HMDs may utilize liquid-crystal (LC) layers that maybe used to block light from reaching the user's eyes to provide shutter-glass functionality. In some embodiments, the LCD may be a thin layer or film disposed on an AR HMD display, the thin layer controllable by the system to selectively block the areas overlapping with the display based on display location and orientation information obtained using methods described above.

In some embodiments, use of AR HMDs as shutter glasses enables viewing of several active stereo displays at the same time. Different active stereo displays can also potentially operate even in different frequencies. Because AR HMD can detect and track several display areas the shutter effect can be restricted only to the view areas overlapping with the various active stereo displays, shutter areas can operate in their own individual frequencies just as long as the frame-rate of the AR HMD display update can synchronize with the combined frequencies of all displays. Furthermore, AR HMD can detect several synchronization signals even in several different transmission techniques, thus being able to simultaneously synchronize with several active stereo displays with different synchronization signal transmission techniques.

In some embodiments where the AR HMD acts as an active shutter, the RGB display capacity of the AR HMD may enhance the main image displayed on the active stereo display. In some embodiments, this may boost luminosity of the active stereo display by combining RGB rendering on the AR HMD with the image rendered on the active stereo display. In some embodiments, the AR HMD selectively blocks areas of the active stereo display, thus making the area of the image intended to be black even blacker. Such embodiments may extend the natural dynamic range of the active stereo display and increase the maximum luminosity beyond what the active stereo display would be capable of producing alone.

In some embodiments, crosstalk between the active stereo display and the AR HMD may be reduced with respect to crosstalk between the active stereo display and traditional active shutter glasses. Due to slow pixel shutdown times, some active stereo displays suffer from crosstalk where a ghost image shown to the other eye is still lingering on the display when switching the eye view. This is reduced in some embodiments by detecting potential crosstalk areas using the AR HMD and compensating for potential crosstalk error by displaying an RGB image on the AR HMD that minimizes the crosstalk (e.g., smoothing out the high contrasts in the potential crosstalk areas).

Some embodiments may minimize flickering by rendering an RGB image for the eye that is currently being blocked from seeing the image on the active stereo display. The AR HMD may be configured to render the content displayed on the active stereo display in lower resolution or in poorer color range for the currently blocked eye with the AR HMD RGB display, reducing the flickering feeling that may be present with the active shutter glasses, as well as reducing the drop in the overall luminosity of the view.

In primary embodiments, the process may be executed using an optical see-through AR HMD that continuously inspects the environment using an embedded camera or RGB-D sensor. However, in alternative embodiments, the computing, communication between components, content management and rendering may be arranged in alternative ways. In such alternative embodiments, the process described above may need some modifications and may be executed on various other types of devices rather than the AR HMD described in previous embodiments.

In some embodiments, occlusions caused by the objects may be detected using the virtual environment model, rather than detecting objects blocking the view of the external display from the users point of view by analyzing images from the display output. In such embodiments, the virtual environment model may have been created in the initialization method, and may have high enough resolution while also covering the whole operational area. In this alternative approach, areas that are going to be obscured by objects in front of the external display are automatically chosen to be rendered on the AR HMD instead of the external display. In such embodiments, areas of external displays blocked by other objects may be detected and chosen to be rendered on AR HMD on first runtime process step where the content is split to be displayed on various displays.

In some embodiments, rather than using the AR HMD sensor for head tracking and detection of display artifacts, alternative embodiments may receive sensor data from sensors embedded in the environment. In such embodiments, the mobile application executing the process may request data from the external sensors, execute user head tracking based on the external sensor data, and determine head tracking based on known external display locations. In some embodiments, the external sensor may be a RGB-D sensor observing the user. In some embodiments the external sensor may be an optical sensor, a magnetic sensor, a depth sensor, or sonic tracking sensor, among others.

In some embodiments, shadows and occlusions caused by objects and/or the viewer may also be detected by analyzing the external sensor data. In such embodiments, problem areas (e.g., occlusion areas) may have already been taken into account during the content split step of the process, thus avoiding situations where an erroneous image needs to initially be displayed in order to be detected. In some embodiments an RGB-D sensor observing the user may detect a shadowed region based on user geometry approximation rather than detecting the shadow region based on the output image.

In some embodiments, an external server may be configured to create the immersive experience and performing the above-described process. In some embodiments, the server may receive sensor data from the AR HMD and perform the whole rendering process based on the received sensor data. In some embodiments, when the sensor data is streamed from the AR HMD to an external server executing the process, the network interface may introduce some level of delay. In embodiments that experience sufficiently high network delays, some of the features described herein may not be implemented (e.g., image error detection and correction during the runtime based camera data analysis may not be implemented).

In alternative embodiments, in addition to executing the rendering process described above for combing the displays, the application producing the display content may be executed on a dedicated server. In such embodiments, the server may connect to all the displays in the environment. Based on the known locations of the displays in relation with the user location, the server may stream content to each display, including the AR HMD device worn by the user.

Figure 13:
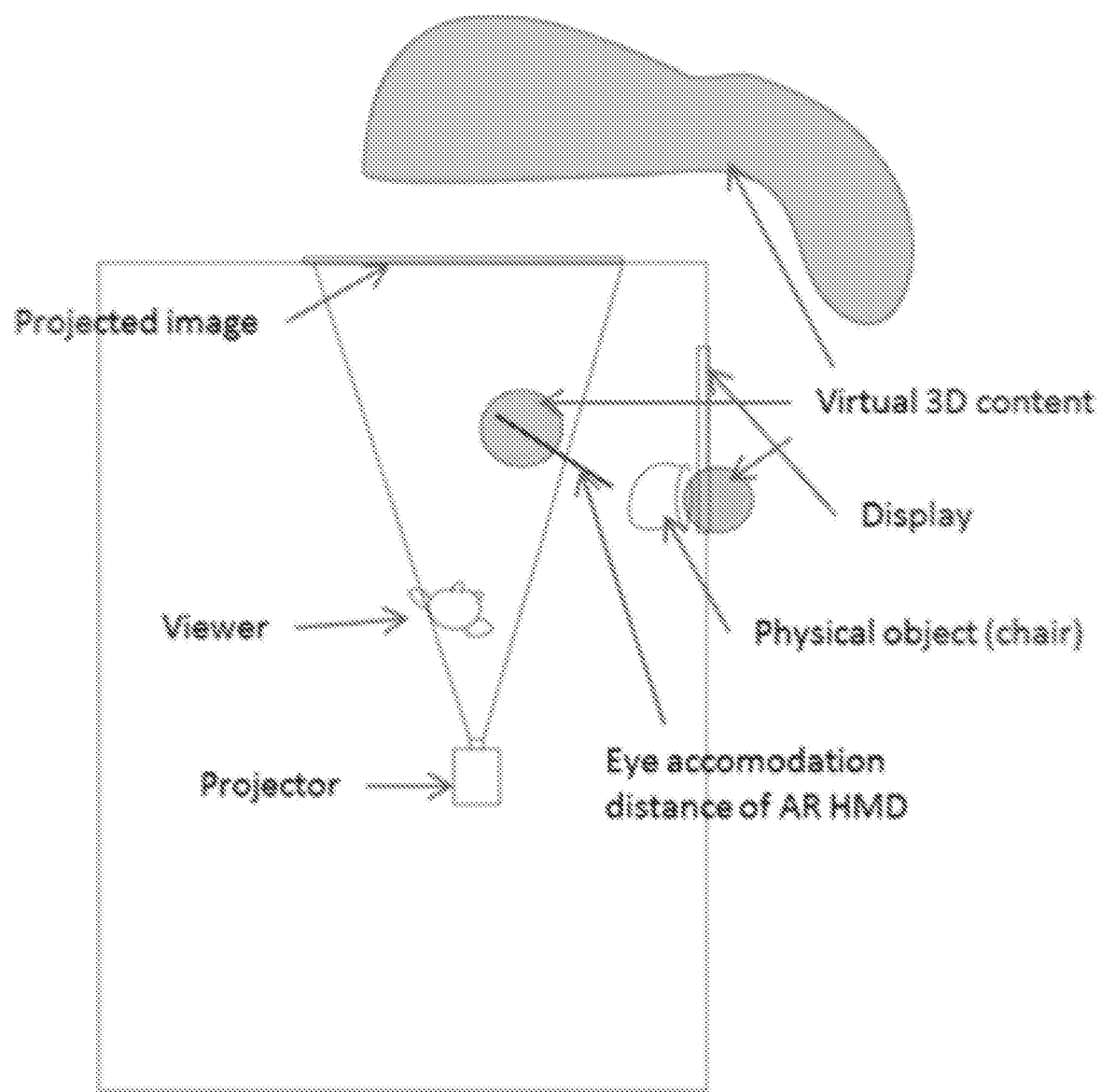
FIG. 13 depicts an example of a user in an immersive environment, in accordance with some embodiments.

FIG. 13 depicts a plan view of a user viewing virtual 3D content in a room with a large scale front projection projector and a normal display. FIG. 13 includes a user in an environment with various virtual 3D elements, a projector, a projection screen, a physical object, and an external display device. As shown, FIG. 13 includes an occlusion from the viewer blocking the projector and an occlusion of the physical object blocking a display screen. In some embodiments, subsequent to the user starting the application that produces the 3D content (e.g., virtual world viewer), the module implementing the rendering process described above may poll for available output devices (e.g., external display devices, and/or the projector) in the environment and connect to any of the available output display devices. In some embodiments, the rendering process creates required render buffers for each external display.

Once the external output devices and their relative locations with respect to the users eye locations are known, the mobile application splits intercepted graphic API calls into 3D content to be sent to different display devices. In some embodiments, 3D content is split based on matching eye accommodation distance, which in some embodiments results in an individual virtual element closest to the user being selected to be displayed entirely on an AR HMD, while other elements at a larger virtual distance are displayed primarily on available external displays. In some embodiments, for each render step, external display locations in relation to the user eye locations are updated based on 3D tracking of the user's motion in the space based on sensor data received from the sensor embedded with the AR HMD (e.g., user head-tracking).

In some embodiments, rendering elements selected to be rendered on the external displays by injecting required modelview, projection and/or viewport settings to the intercepted graphic API calls. Once the views have been rendered to the render buffers, overlapping areas of objects to be rendered on the AR HMD are masked out from the render buffers and the render buffers are streamed to the external displays. FIG. 14 illustrates the output on the external displays after masking out areas chosen to be rendered on the AR HMD. As shown, a portion of the 3D element to be displayed on the projection screen is masked out due to a different 3D element to be displayed on the AR HMD.

Figure 15:
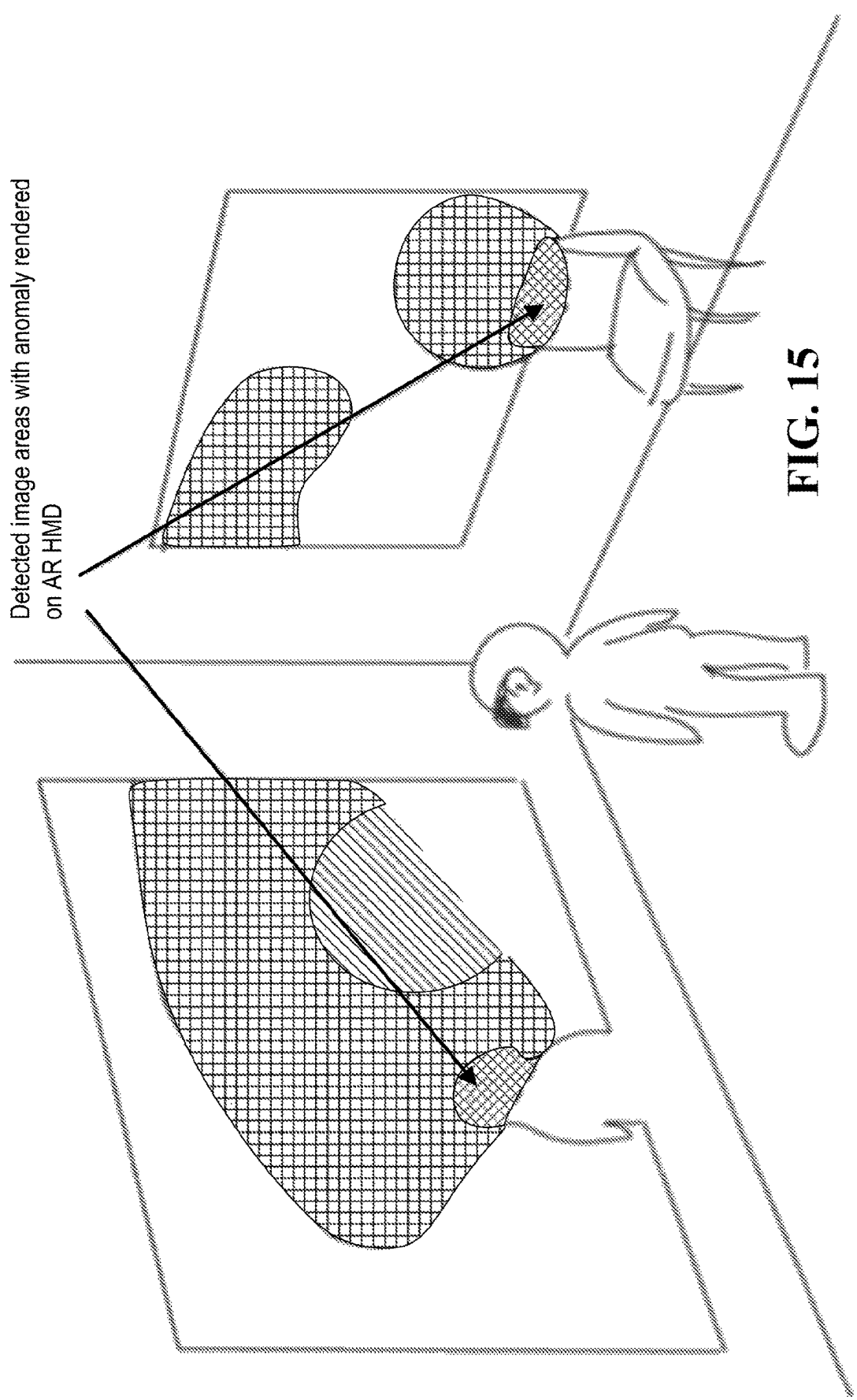
FIG. 15 depicts an example of fixing detected artifacts, in accordance with some embodiments.

In some embodiments, after display images are streamed and shown on the external displays, the mobile application may analyze camera sensor data captured by the camera embedded in the AR HMD for artifacts in the output image. In some embodiments, a shadow cast by the viewer on the projected image and occlusion caused by the chair in front of the display are detected. For the erroneous image areas, corrected parts of the view are rendered and displayed on the AR HMD, as illustrated in FIG. 15.

Figure 16:
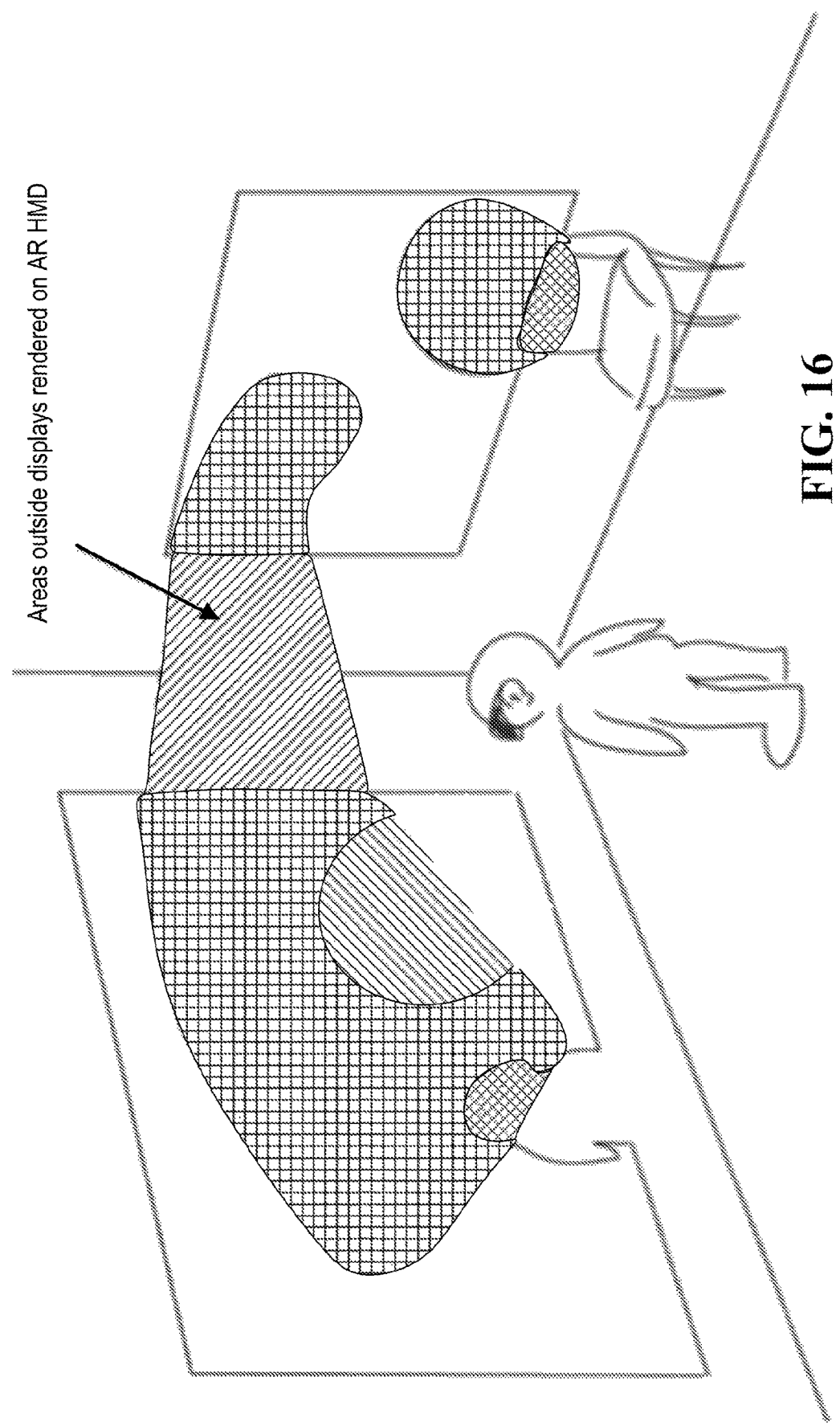
FIG. 16 depicts an example of an AR HMD rendering content outside of the displays, in accordance with some embodiments.

In some embodiments, the AR HMD renders areas of the 3D content that lie outside the areas covered by the external display devices. An example embodiment is shown in FIG. 16. As shown in FIG. 16, 3D content rendered on the AR HMD bridges the area between the two displays.

In some embodiments, 3D content elements selected to be displayed on the AR HMD are rendered and displayed on AR HMD, as shown in FIG. 17.

Shutter Glasses Variation

Figure 18:
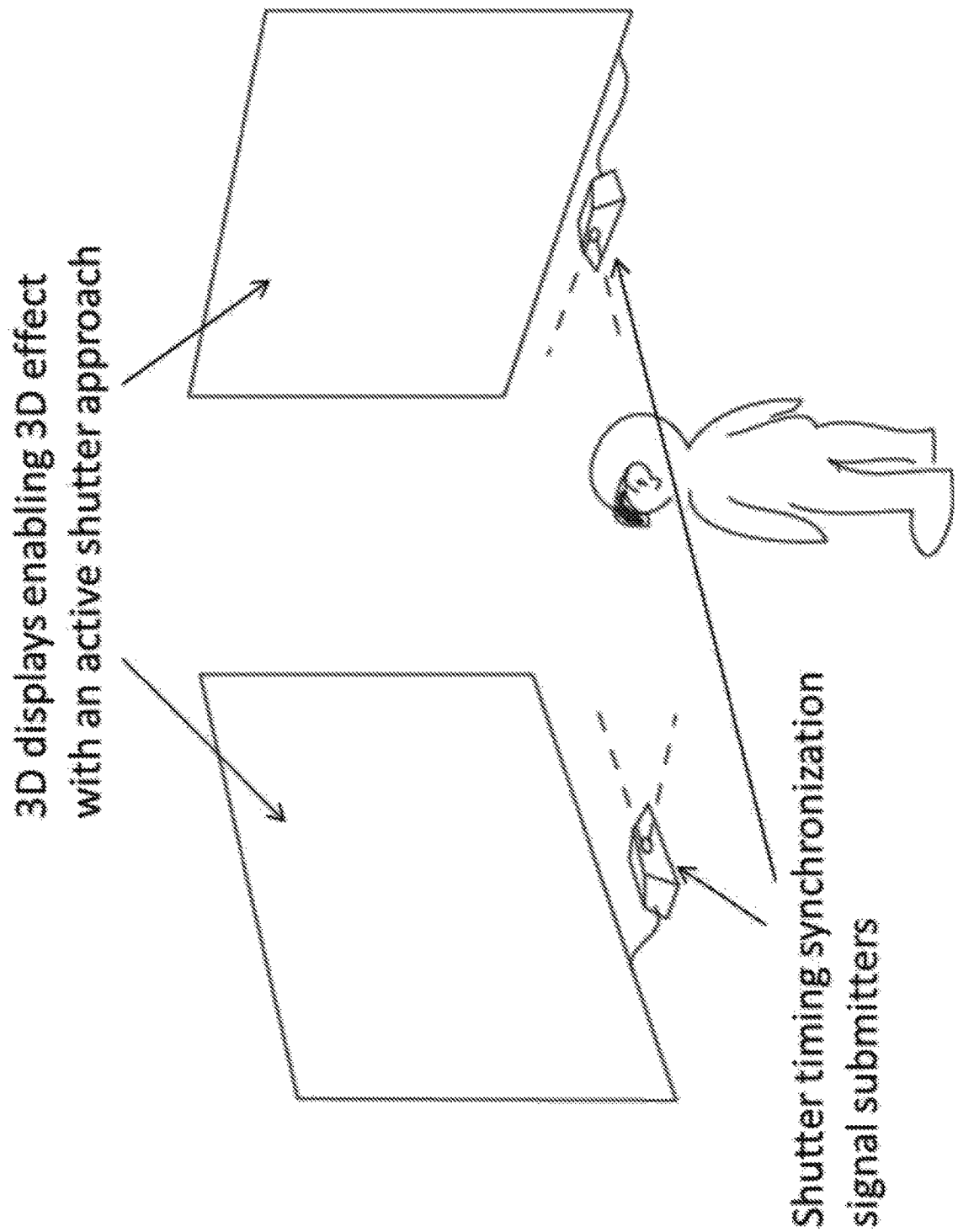
FIG. 18 depicts an embodiment utilizing the AR HMD as shutter glasses, in accordance with some embodiments.

Presenting a complete AR/VR experience using HMDs can produce eye strain, headaches, nausea, and fatigue, partly due to convergence-accommodation conflict. Further, using stereoscopic projection limits opportunities for personalization per user and privacy. In some embodiments, the above-described process produces a combined AR HMD/ stereoscopic projection, where the AR HMD simultaneously serves as active shutter glasses for the projection. An example embodiment is shown in FIG. 18. As shown, FIG. 18 includes a user wearing an AR HMD and two external display devices, each external display having a corresponding shutter timing synchronization signal submitter. In some embodiments, the displays enable 3D effects while using an active shutter approach.

In some embodiments, a method includes the steps of capturing, using a forward-facing camera associated with an AR HMD, images of a portion of a first projection screen, responsively determining that the captured images represent a first portion of content related to an AR presentation, and configuring the AR HMD to produce imagery at a frequency associated with the first portion of content while the AR HMD also presents a second portion of content related to the AR presentation. In some embodiments, the first portion of content related to the AR presentation is displayed as alternating frames of a stereoscopic projection. In some embodiments, the produced imagery functions as alternating left and right shutters. In some embodiments, left-eye imagery for the second portion of content related to the AR presentation is displayed in a portion of the AR HMD associated with the left-eye display, while imagery for producing a shutter effect for the right eye is displayed in a portion of the AR HMD associated with the right-eye display, and vice versa.

In some embodiments, synchronization is determined by analysis of camera signals capturing images of the projection screen. In some embodiments, the method further comprises detecting the frequency of the left/right displays. In some embodiment the detection is done through image analysis. In some embodiments the detection is done through occlusion analysis.

In some embodiments, a method for allocating display of content amongst display devices in an AR system includes the steps of: capturing, with a forward-facing camera associated with a head-mounted AR display, images of portions of first and second display devices in an environment, the first and second display devices displaying first and second portions of content related to an AR presentation, and displaying a third portion of content related to the AR presentation on the head-mounted AR display, the third portion determined based upon the images of portions of first and second display devices captured using the forward-facing camera of the head-mounted AR display, wherein the determination of the third portion of content related to the AR presentation comprises determination of portions of the content related to the AR presentation associated with portions of the field of view that are not occupied by the first or second display devices.

In some embodiments, a method to improve immersive multi-device virtual/augmented experiences includes the steps of: identifying available display devices in an experience environment with a content streaming interface, allocating render buffers for each available display, splitting content into parts displayed on AR HMD or on connected external displays, tracking user head location and calculate additional view transformations (e.g., model view, projection and viewport) used to render virtual environment as seen from the user point of view on the external displays in the environment, rendering images to be displayed on each external display in the environment and stream images to the displays, masking out areas of images to be displayed on external displays where elements to be rendered on the AR HMD will overlap to minimize color bleeding from the external display to the AR HMD display.

In some embodiments, the method further comprises inspecting the displayed images on the external displays with AR HMD camera to detect artifacts caused by object occlusions. In some embodiments, the method further comprises rendering missing parts of the images or artifacts on the AR HMD. In some embodiments, the method further comprises rendering areas outside the surface areas of the external displays on the AR HMD. In some embodiments, the method further comprises rendering elements chosen to be displayed on AR HMD. In some embodiments, the AR HMD may utilize active stereo, and may repeat the process using one eye's transformation, while blocking a second eye. In some embodiments, the method further comprises switching the eye which is being blocked with the AR HMD.

In some embodiments, the method further comprises creating two render buffers for each display, one buffer for each eye or a single for each display if not stereoscopic.

Figure 19:
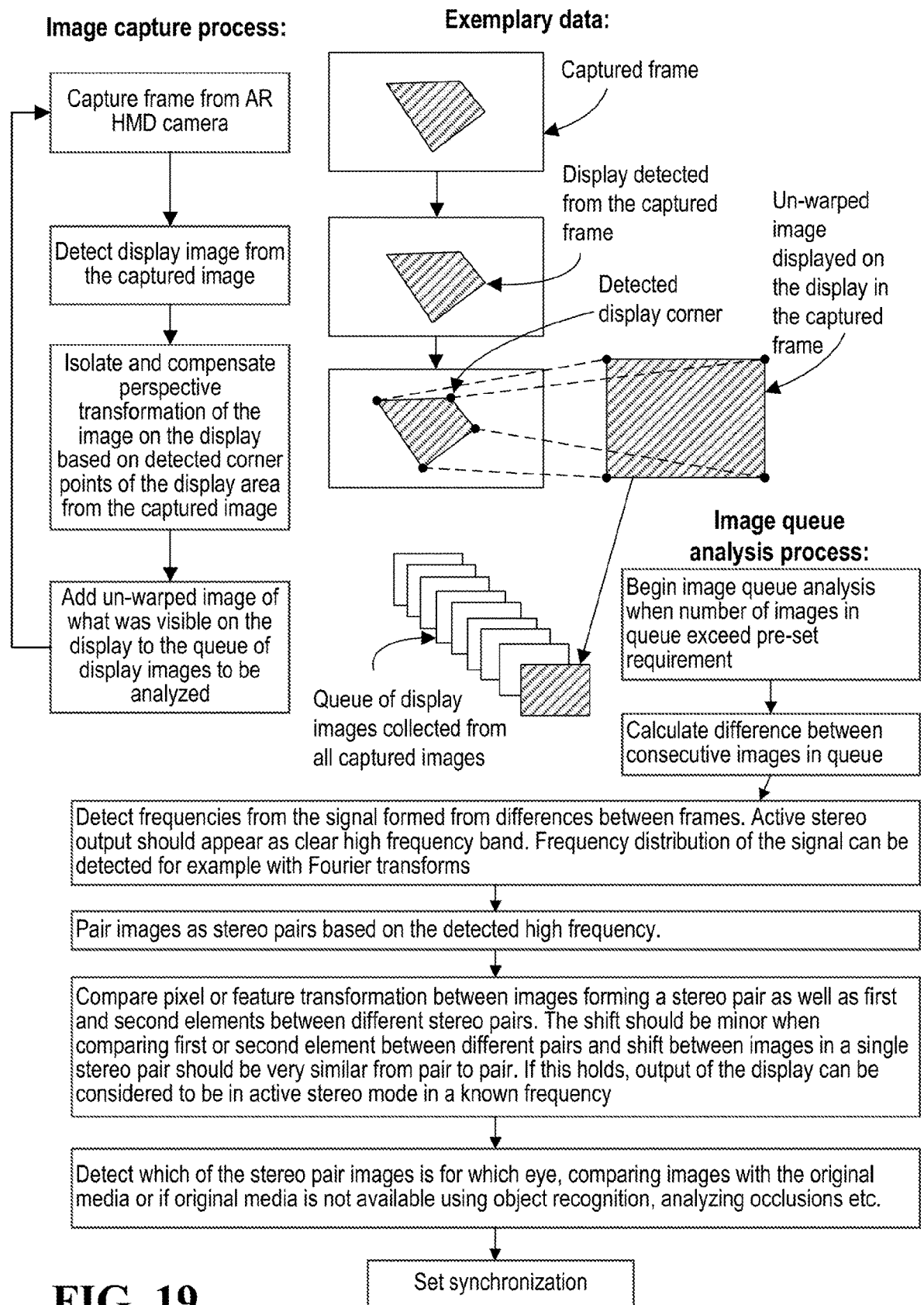
FIG. 19 is a flowchart of a process, in accordance with some embodiments.

FIG. 19 depicts a flowchart of a process, in accordance with some embodiments. As shown, FIG. 19 includes an image capture process including the steps of capturing a frame from an AR HMD, detecting a display image from the captured frame, isolating and compensating a perspective transformation of the image on the HMD based on detected corner points of the display area from the captured image, and adding an un-warped image of what was visible on the display to the queue of display images to be analyzed. Once a number of images in the queue of display images exceeds a pre-set requirement, the image queue analysis process begins. As shown in FIG. 19, the image queue analysis process includes the steps of calculating differences between consecutive images in the queue and detecting frequencies from the differences between frames (active stereo output should appear as a clear high frequency band). In some embodiments, the frequency distribution may be detected using Fourier transforms. The next step is to pair images as stereo pairs based on the detected high frequency band. Pixels or feature transformations are compared between images forming a stereo pair as well as first and second elements between stereo pairs. The shift may be minor when comparing first or second elements between different pairs and shift between images in a single stereo pair. In preferred embodiments, the shift between images in the stereo pair will be minor. If this holds, the output of the display may be determined to be in active stereo mode at a known frequency. The next step may be to detect which of the stereo pair images is for which eye. In some embodiments this is done by comparing the images with the original media, or using object recognition (occlusions, etc.). Lastly, the synchronization is set for the active shutter glasses.

In one embodiment, there is a method comprising: detecting a configuration of a transformable display; detecting a position of a user; and transforming a graphical output to the transformable display based on the position and the configuration.

In one embodiment, there is a system including: a first sensor operative to detect a configuration of a transformable display; a second sensor operative to detect a position of a user; and a display configuration manager operative to transform a graphical output to the transformable display based on the position and the configuration.

In one embodiment, there is a method comprising: receiving sensor data from a plurality of sensors; detecting a display configuration of at least one display; generating a projection transformation based on the display configuration; generating an output video stream applying the projection transformation to an unmodified video stream; and transmitting the output video stream to the at least one display. In some embodiments, the method may further comprise wherein the plurality of sensors comprises a user tracking sensor. In some embodiments, the method may further comprise wherein the user tracking sensor is an RGB-D sensor. In some embodiments, the method may further comprise wherein the user tracking sensor is a camera. In some embodiments, the method may further comprise determining a main user from a group of users using the user tracking sensor. In some embodiments, the method may further comprise determining user eye locations using the user tracking sensor. In some embodiments, the method may further comprise wherein the plurality of sensors comprises a display configuration sensor. In some embodiments, the method may further comprise wherein the display configuration sensor is an angle-detecting sensor. In some embodiments, the method may further comprise wherein the display configuration sensor is an electrical potentiometer. In some embodiments, the method may further comprise wherein detecting the display configuration comprises detecting an angle between two or more displays. In some embodiments, the method may further comprise wherein detecting the display configuration comprises determining a shape of the at least one display. In some embodiments, the method may further comprise wherein detecting the display configuration comprises determining relative locations of two or more displays. In some embodiments, the method may further comprise wherein the at least one display comprises a flat display. In some embodiments, the method may further comprise wherein the at least one display comprises a curved display. In some embodiments, the method may further comprise wherein the at least one display comprises a flexible display. In some embodiments, the method may further comprise wherein generating the projection transformation further comprises determining an area to be rendered by the output video stream. In some embodiments, the method may further comprise wherein the display configuration is determined for a predetermined user location. In some embodiments, the method may further comprise wherein the display configuration is continuously updated. In some embodiments, the method may further comprise transmitting configuration controls to the at least one displays. In some embodiments, the method may further comprise wherein the configuration controls adjust the display configuration. In some embodiments, the method may further comprise wherein the configuration controls are input via a touch screen. In some embodiments, the method may further comprise wherein the configuration controls are input via a keyboard. In some embodiments, the method may further comprise wherein the configuration controls are input via voice command. In some embodiments, the method may further comprise wherein the configuration controls are input via a controller. In some embodiments, the method may further comprise wherein the configuration controls are input via a joystick. In some embodiments, the method may further comprise wherein a display dynamically appears. In some embodiments, the method may further comprise wherein a display dynamically disappears. In some embodiments, the method may further comprise wherein the output video stream is based on a stereoscopic rendering. In some embodiments, the method may further comprise detecting head tracking of a user. In some embodiments, the method may further comprise wherein detecting the display configuration comprises detecting an orientation of the at least one display. In some embodiments, the method may further comprise wherein detecting the display configuration comprises detecting a number of displays within a user's viewing range. In some embodiments, the method may further comprise wherein detecting the display configuration comprises detecting a location of the at least one display. In some embodiments, the method may further comprise wherein detecting the display configuration comprises detecting a shape of the at least one display.

In one embodiment, there may be an apparatus comprising: a user sensor configured to detect user information; a display configuration sensor configured to detect a display configuration of at least one display; a dynamic display configuration manager configured to receive the user information, the display configuration, and graphic API calls, the dynamic display configuration manager configured to calculate a projection transformation, and to responsively render a respective video output for each of the at least one display by applying the projection transformation to respective unmodified video streams; and a graphics driver configured to output the respective rendered video outputs. The apparatus may further comprise wherein the user sensor is configured to detect user eye location. The apparatus may further comprise wherein the user sensor is configured to determine a main user. The apparatus may further comprise wherein user sensor is configured to provide headtracking information. The apparatus may further comprise wherein the user sensor comprises a RGB-D sensor. The apparatus may further comprise wherein the user sensor comprises an inertial measurement unit (IMU). The apparatus may further comprise wherein the user sensor comprises a camera. The apparatus may further comprise wherein the display configuration sensor is configured to detect a number of available displays. The apparatus may further comprise wherein the display configuration sensor is configured to detect locations of the at least one display. The apparatus may further comprise wherein the display configuration sensor is configured to detect relative locations of two or more displays. The apparatus may further comprise wherein the display configuration sensor is configured to detect orientation of the at least one display. The apparatus may further comprise wherein the display configuration sensor is an angle detector configured to detect an angle between two displays. The apparatus may further comprise wherein the display configuration sensor is configured to determine shape of the at least one display. The apparatus may further comprise wherein the display configuration sensor is a depth sensor. The apparatus may further comprise wherein the display configuration sensor is a sonic sensor. The apparatus may further comprise wherein the display configuration is an optical sensor. The apparatus may further comprise wherein the display configuration is a magnetic sensor. The apparatus may further comprise wherein the at least one display comprises a planar display. The apparatus may further comprise wherein the at least one display comprises a non-planar display. The apparatus may further comprise wherein the dynamic display configuration manager is configured to read back a first render image based on a normal projection, and to responsively warp the first rendered image to correct display geometry deformations, and to send the warped image to at least one display. The apparatus may further comprise wherein the at least one display comprises a flexible display. The apparatus may further comprise wherein the at least one display comprises an organic light-emitting diode (OLED) display. The apparatus may further comprise wherein the at least one display comprises a liquid crystal display (LCD). The apparatus may further comprise wherein the display configuration sensor is configured to detect at least one display that dynamically appears. The apparatus may further comprise wherein the display configuration sensor is configured to detect at least one display that dynamically disappears. The apparatus may further comprise wherein the dynamic display configuration manager is configured to receive user configuration controls. The apparatus may further comprise wherein the display configuration is adjusted according to the user configuration controls. The apparatus may further comprise wherein the user configuration controls comprise a display orientation change request. The apparatus may further comprise wherein the user configuration controls comprise a display turn on/shutoff request. The apparatus may further comprise wherein the user configuration controls comprise a display change-of-shape request.

In one embodiment, there is a method comprising: receiving a captured frame from a front-facing camera embedded on an AR HMD; identifying a warped display image in the captured frame; forming an un-warped display image using the display image; and comparing the un-warped display image to an original display image, and determining if artifacts are present. In some embodiments, the method may further comprise wherein the artifacts include shadow occlusions. In some embodiments, the method may further comprise wherein the artifacts include object occlusions. In some embodiments, the method may further comprise wherein identifying the warped display image comprises identifying corners of the warped display image. In some embodiments, the method may further comprise wherein forming the un-warped image comprises identifying perspective information based on the identified corners, and applying a first transformation to the warped display image based on the perspective information. In some embodiments, the method may further comprise wherein the first transformation is based on a modelview transformation/matrix. In some embodiments, the method may further comprise wherein the first transformation is a viewport transformation. In some embodiments, the method may further comprise: determining missing content obscured by the artifacts; applying a second transformation to the missing content; and displaying the transformed missing content on a display on the AR HMD. In some embodiments, the method may further comprise wherein the second transformation is an inverse of the first transformation.

In one embodiment, there is a method comprising: detecting an artifact in a virtual presentation, the artifact at a first position; correcting the artifact in the virtual presentation at a first time at the first position; and correcting the first artifact at a second time at a second position, the second position determined at least in part based on the first position. In some embodiments, the method may further comprise estimating the second position based on the first position. In some embodiments, the method may further comprise wherein estimating the second position is further based on a third position, the third position at a third time that is prior to the first time. In some embodiments, the method may further comprise wherein estimating the second position is based in part on Kalman filtering.

In one embodiment, there is a method comprising: receiving a captured frame captured using a front-facing camera embedded on an AR HMD; identifying a warped display image in the captured frame; forming a warped original image based on a transformation of an original image; and comparing the warped display image to the warped original image, and identifying one or more artifacts. In some embodiments, the method may further comprise wherein the transformation is based on perspective information. In some embodiments, the method may further comprise wherein the perspective information is obtained by identifying corners of the warped display image. In some embodiments, the method may further comprise wherein the artifacts are occluding objects. In some embodiments, the method may further comprise wherein the artifacts are shadowed areas. In some embodiments, the method may further comprise wherein the artifacts are overlaps between virtual objects displayed on the AR HMD and the warped display image. In some embodiments, the method may further comprise masking areas corresponding to the overlaps on an external display currently displaying the warped display image.

In one embodiment, there is an apparatus comprising: a front-facing camera embedded on an AR HMD configured to captured a frame; an image processor configured to receive the captured frame, to identify a warped display image in the captured frame, and to form an un-warped display image using the display image; and a comparison module configured to compare the un-warped display image to an original display image, and to determine if artifacts are present. In some embodiments, the apparatus may further comprise wherein the artifacts include shadow occlusions. In some embodiments, the apparatus may further comprise wherein the artifacts include object occlusions. In some embodiments, the apparatus may further comprise wherein the image processor is configured to identify corners of the warped display image. In some embodiments, the apparatus may further comprise wherein the image processer is configured to form the un-warped image by identifying perspective information based on the identified corners, and applying a first transformation to the warped display image based on the perspective information. In some embodiments, the apparatus may further comprise wherein the transformation is based on a modelview transformation/matrix. In some embodiments, the apparatus may further comprise wherein the transformation is a viewport transformation. In some embodiments, the apparatus may further comprise wherein the image processor is configured to: determine missing content obscured by the artifacts; and apply a second transformation to the missing content; and displaying the transformed missing content on a display on the AR HMD. In some embodiments, the apparatus may further comprise wherein the second transformation is an inverse of the first transformation.

In one embodiment, there is an apparatus comprising: an image detection module configured to detect an artifact in a virtual presentation, the artifact at a first position; an image correction module configured to correct the artifact in the virtual presentation at a first time at the first position, and to correct the first artifact at a second time at a second position, the second position determined at least in part based on the first position. In some embodiments, the apparatus may further comprise wherein the image correction module is configured to estimate the second position based on the first position. In some embodiments, the apparatus may further comprise wherein estimating the second position is further based on a third position, the third position at a third time that is prior to the first time. In some embodiments, the apparatus may further comprise wherein estimating the second position is based in part on Kalman filtering.

In one embodiment, there is an apparatus comprising: a front-facing camera embedded on an AR HMD configured to captured a frame; an image processor configured to receive the captured frame, to identify a warped display image in the captured frame, and to form a warped original image based on an original image; and a comparison module configured to compare the warped display image to the warped original image, and to determine if artifacts are present. In some embodiments, the apparatus may further comprise wherein the image processor is configured to generate the warped original image by applying the transformation to the original image. In some embodiments, the apparatus may further comprise wherein the transformation is based on perspective information. In some embodiments, the apparatus may further comprise wherein the image processor obtains perspective information by identifying corners of the warped display image. In some embodiments, the apparatus may further comprise wherein the artifacts are occluding objects. In some embodiments, the apparatus may further comprise wherein the artifacts are shadowed areas. In some embodiments, the apparatus may further comprise wherein the artifacts are overlaps between virtual objects displayed on the AR HMD and the warped display image. In some embodiments, the apparatus may further comprise a masking module configured to mask areas of an external display corresponding to the overlaps between virtual objects.

In one embodiment, there is a method comprising: providing a video presentation on an external display; determining that a portion of the video presentation is obstructed for a user; and displaying the obstructed portion of the video presentation on a head-mounted display of the user. In some embodiments, the method may further comprise wherein the obstructed portion of the video presentation displayed on the head-mounted display is aligned with the video presentation on the external display from the perspective of the user. In some embodiments, the method may further comprise wherein the external display is a television screen. In some embodiments, the method may further comprise generating the video presentation by modifying an original video presentation according to a view transformation. In some embodiments, the method may further comprise wherein the view transformation is a modelview transformation. In some embodiments, the method may further comprise wherein the view transformation is based on viewport settings. In some embodiments, the method may further comprise wherein the view transformation is based on user head-tracking. In some embodiments, the method may further comprise wherein the view transformation is based on a virtual environment model. In some embodiments, the method may further comprise wherein the determination of the obstructed portion is done in at least in part by using front-facing cameras on the head-mounted display. In some embodiments, the method may further comprise: generating a virtual environment model of the user's environment; and determining the obstructed portion based on the virtual environment model. In some embodiments, the method may further comprise wherein the virtual environment model is generated at least in part using a sensor on the head-mounted display. In some embodiments, the method may further comprise wherein the sensor comprises a device selected from the set consisting of: an optical sensor, a magnetic sensor, a depth sensor, and a sonic tracking sensor.

In one embodiment, there is a method comprising: projecting a video presentation onto a surface; determining that a portion of the projected video presentation is shadowed; and displaying the shadowed portion of the video presentation on a head-mounted display of a user. In some embodiments, the method may further comprise wherein the shadowed portion of the video presentation displayed on the head-mounted display is aligned with the projected video presentation from the perspective of the user. In some embodiments, the method may further comprise turning off areas of a projector corresponding to the video presentation occupied by the shadowed portion of the projected video presentation.

In one embodiment, there is a method comprising: providing a first portion of a video presentation on a first external display and a second portion of the video presentation on a second external display; and displaying a third portion of the video presentation on a head-mounted display, wherein the third portion is displayed in a space between the first and second external displays. In some embodiments, the method may further comprise wherein the third portion of the video presentation is aligned with the first and second portions from the perspective of a user of the head-mounted display. In some embodiments, the method may further comprise wherein the first and second external displays are active stereo displays. In some embodiments, the method may further comprise wherein the first and second external displays have corresponding first and second display frequencies, respectively. In some embodiments, the method may further comprise wherein the first and second display frequencies are different. In some embodiments, the method may further comprise detecting the first and second display frequencies using a camera on the head-mounted display. In some embodiments, the method may further comprise independently blocking the first and second external displays for a first eye using the head-mounted display. In some embodiments, the method may further comprise alternately blocking the first and second external displays for the first eye and a second eye at the first and second detected display frequencies, respectively. In some embodiments, the method may further comprise receiving the first and second display frequencies from first and second shutter timing synchronization signal transmitters, respectively.

In one embodiment, there is a method comprising: providing a first portion of a video presentation on a first external display and a second portion of the video presentation on a second external display; and displaying a third portion of the video presentation on a head-mounted display, wherein the third portion at least in part overlaps an area on the first or second external displays. In some embodiments, the method may further comprise masking out overlapped area. In some embodiments, the method may further comprise wherein masking out comprises turning of pixels in the overlapped area. In some embodiments, the method may further comprise wherein masking out comprises displaying a mask color in the overlapped area. In some embodiments, the method may further comprise wherein the mask color is black.

In one embodiment, there is a method comprising: capturing, using a forward-facing camera associated with a head-mounted augmented reality (AR) head-mounted display (HMD), images of portions of first and second display devices in an environment, the first and second display devices displaying first and second portions of content related to an AR presentation; and displaying a third portion of content related to the AR presentation on the AR HMD, the third portion determined based upon the images of portions of the first and second display devices captured using the forward-facing camera. In some embodiments, the method may further comprise wherein the determination of the third portion of content related to the AR presentation comprises determination of portions of the content related to the AR presentation associated with portions of the field of view that are not occupied by the first or second display devices.

In one embodiment, there is a method comprising: connecting to an external display; intercepting a set of 3D content; partitioning the set of 3D content into a first virtual element and a second virtual element; displaying the first virtual element on the external display; and displaying the second virtual element on a local display. In some embodiments, the method may further comprise wherein the local display is an optical see-through augmented-reality (AR) head-mounted display (HMD). In some embodiments, the method may further comprise wherein the external display is a television. In some embodiments, the method may further comprise wherein the external display is a projection screen. In some embodiments, the method may further comprise detecting an occlusion area on the external display. In some embodiments, the method may further comprise wherein the occlusion area is a shadow cast on a projection screen. In some embodiments, the method may further comprise wherein the occlusion area is an area on a television screen blocked by an object. In some embodiments, the method may further comprise rendering content blocked by the occlusion area on the local display. In some embodiments, the method may further comprise applying a view transformation to at least one of the first and second virtual elements. In some embodiments, the method may further comprise wherein the view transformation is a modelview transformation. In some embodiments, the method may further comprise wherein the view transformation is based on viewport settings. In some embodiments, the method may further comprise wherein the view transformation is determined based on user head tracking. In some embodiments, the method may further comprise respectively assigning the first and second virtual elements to the external display and local display based on natural eye accommodation. In some embodiments, the method may further comprise generating a virtual environment model comprising a virtual layout of the external display with respect to a user. In some embodiments, the method may further comprise wherein the virtual environment model comprises relative external display distance. In some embodiments, the method may further comprise wherein the virtual environment model comprises position information of one or more objects with respect to the external display and the user. In some embodiments, the method may further comprise determining occlusions based on the virtual environment model. In some embodiments, the method may further comprise wherein the virtual environment model is calculated based on sensor data from depth sensors. In some embodiments, the method may further comprise detecting overlapping areas between the local display and the external display. In some embodiments, the method may further comprise displaying content of the external display in the overlapping area on the local display. In some embodiments, the method may further comprise rendering the overlapping area of the external display with a mask color. In some embodiments, the method may further comprise detecting image artifacts on the external and/or local display. In some embodiments, the method may further comprise wherein the image artifacts are occlusions. In some embodiments, the method may further comprise wherein the image artifacts are overlaps between the local and external display. In some embodiments, the method may further comprise wherein the local display extends the display area of the external display. In some embodiments, the method may further comprise displaying a third virtual element on a second external display, the third virtual element partitioned from the 3D content. In some embodiments, the method may further comprise wherein the local display bridges a gap between the external display and the second external display. In some embodiments, the method may further comprise wherein the external display and second external displays are active stereo displays, each having a respective display frequency. In some embodiments, the method may further comprise detecting the respective display frequencies using a camera attached to the local display. In some embodiments, the method may further comprise wherein the respective display frequencies are different. In some embodiments, the method may further comprise wherein the local display operates as shutter glasses, and wherein the local display blocks a first eye for the external display at a first display frequency of the respective display frequencies, and wherein the local display blocks the first eye for the second external display at a second display frequency of the respective display frequencies. In some embodiments, the method may further comprise wherein the external display is an active stereo display. In some embodiments, the method may further comprise wherein the local display blocks a first eye of a user and displays the first and second virtual elements for a second eye of the user. In some embodiments, the method may further comprise wherein blocking the first eye comprises blocking a portion of the local display occupied by the external display as seen by the first eye. In some embodiments, the method may further comprise displaying an RGB image for the first eye on the local display.

In one embodiment, there is an apparatus comprising: a transmission unit configured to stream a video presentation to an external display; a camera mounted on a head-mounted display configured to determine that a portion of the video presentation is obstructed for a user; and a transparent screen on the head-mounted display configured to display the obstructed portion of the video presentation. In some embodiments, the apparatus may further comprise wherein the obstructed portion of the video presentation displayed on the head-mounted display is aligned with the video presentation on the external display from the perspective of a user. In some embodiments, the apparatus may further comprise wherein the external display is a television screen. In some embodiments, the apparatus may further comprise a transformation module configured to generate the video presentation by modifying an original video presentation according to a view transformation. In some embodiments, the apparatus may further comprise wherein the view transformation is a modelview transformation. In some embodiments, the apparatus may further comprise wherein the view transformation is based on viewport settings. In some embodiments, the apparatus may further comprise wherein the view transformation is based on user head-tracking. In some embodiments, the apparatus may further comprise wherein the view transformation is based on a virtual environment model. In some embodiments, the apparatus may further comprise a processor, the processor configured to: generate a virtual environment model of the user's environment; and determine the obstructed portion based on the virtual environment model. In some embodiments, the apparatus may further comprise wherein the processor generates the virtual environment model at least in part in response to receiving sensor data from a sensor on the head-mounted display. In some embodiments, the apparatus may further comprise wherein the sensor comprises a device selected from the set consisting of: an optical sensor, a magnetic sensor, a depth sensor, and a sonic tracking sensor.

In one embodiment, there is a system comprising: a projector configured to project a video presentation onto a surface; a sensor configured to determine that a portion of the projected video presentation is shadowed; and a head-mounted display configured to display the shadowed portion of the video presentation. In some embodiments, the system may further comprise wherein the shadowed portion of the video presentation displayed on the head-mounted display is aligned with the projected video presentation from the perspective of a user. In some embodiments, the system may further comprise wherein the projector is configured to turn off areas corresponding to the video presentation occupied by the shadowed portion of the projected video presentation. In some embodiments, the system may further comprise wherein the projector is mounted to the head-mounted display. In some embodiments, the system may further comprise wherein the projector is external with respect to the head-mounted display.

In one embodiment, there is an apparatus comprising: a streaming module configured to display a first portion of a video presentation on a first external display and a second portion of the video presentation on a second external display; and a head-mounted display configured to display a third portion of the video presentation, wherein the third portion is displayed in a space between the first and second external displays. In some embodiments, the apparatus may further comprise wherein the third portion of the video presentation is aligned with the first and second portions from the perspective of a user of the head-mounted display. In some embodiments, the apparatus may further comprise wherein the first and second external displays are active stereo displays. In some embodiments, the apparatus may further comprise wherein the first and second external displays have corresponding first and second display frequencies, respectively. In some embodiments, the apparatus may further comprise wherein the first and second display frequencies are different. In some embodiments, the apparatus may further comprise a camera mounted on the head-mounted display configured to detect the first and second display frequencies. In some embodiments, the apparatus may further comprise wherein the head-mounted display is a semi-transparent display, and is configured to independently block regions of the semi-transparent display corresponding to the first and second external displays for a first eye at the first and second display frequencies, respectively. In some embodiments, the apparatus may further comprise wherein the head-mounted display is configured to alternately block regions of the semi-transparent display corresponding to the first and second external displays for the first eye and a second eye at the first and second detected display frequencies, respectively. In some embodiments, the apparatus may further comprise first and second shutter timing synchronization signal transmitters configured to receive the first and second display frequencies, respectively.

In one embodiment, there is an apparatus comprising: a streaming module configured to display a first portion of a video presentation on a first external display and a second portion of the video presentation on a second external display; and a head-mounted display configured to display a third portion of the video presentation on a head-mounted display, wherein the third portion at least in part overlaps an area on the first or second external displays. In some embodiments, the apparatus may further comprise wherein the streaming module is configured to mask out the overlapped area. In some embodiments, the apparatus may further comprise wherein masking out comprises turning of pixels in the overlapped area. In some embodiments, the apparatus may further comprise wherein masking out comprises displaying a mask color in the overlapped area. In some embodiments, the apparatus may further comprise wherein the mask color is black.

In one embodiment, there is an apparatus comprising: a forward-facing camera configured to capture images of portions of first and second display devices in an environment, the first and second display devices displaying first and second portions of content related to an augmented-reality (AR) presentation; and a head-mounted display configured to display a third portion of content related to the AR presentation, the third portion determined based upon the images of portions of the first and second display devices captured using the forward-facing camera. In some embodiments, the apparatus may further comprise wherein the determination of the third portion of content related to the AR presentation comprises determination of portions of the content related to the AR presentation associated with portions of the field of view that are not occupied by the first or second display devices.

In one embodiment, there is an apparatus comprising: a network module configured to connect to an external display; a processor running a mobile application, the mobile application executing instructions comprising intercepting a set of 3D content and partitioning the set of 3D content into a first virtual element and a second virtual element; a streaming module configured to display the first virtual element on the external display; and a head-mounted display configured to display the second virtual element. In some embodiments, the apparatus may further comprise wherein the head-mounted display is an optical see-through augmented-reality (AR) head-mounted display (HMD). In some embodiments, the apparatus may further comprise wherein the external display is a television. In some embodiments, the apparatus may further comprise wherein the external display is a projection screen. In some embodiments, the apparatus may further comprise a camera configured to detect an occlusion area on the external display. In some embodiments, the apparatus may further comprise wherein the occlusion area is a shadow cast on a projection screen. In some embodiments, the apparatus may further comprise wherein the occlusion area is an area on a television screen blocked by an object. In some embodiments, the apparatus may further comprise rendering content blocked by the occlusion area on the head-mounted display. In some embodiments, the apparatus may further comprise wherein the mobile application is further configured to apply a view transformation to at least one of the first and second virtual elements. In some embodiments, the apparatus may further comprise wherein the view transformation is a modelview transformation. In some embodiments, the apparatus may further comprise wherein the view transformation is based on viewport settings. In some embodiments, the apparatus may further comprise wherein the view transformation is determined based on user head tracking. In some embodiments, the apparatus may further comprise wherein the mobile application is further configured to respectively assign the first and second virtual elements to the external display and local display based on natural eye accommodation. In some embodiments, the apparatus may further comprise wherein the processor is configured to generate a virtual environment model comprising a virtual layout of the external display with respect to a user. In some embodiments, the apparatus may further comprise wherein the virtual environment model comprises relative external display distance. In some embodiments, the apparatus may further comprise wherein the virtual environment model comprises position information of one or more objects with respect to the external display and the user. In some embodiments, the apparatus may further comprise wherein the mobile application is configured to determine occlusions based on the virtual environment model. In some embodiments, the apparatus may further comprise a sensor configured to collect sensor data used to determine the virtual environment model. In some embodiments, the apparatus may further comprise wherein the sensor comprises a device selected from the group consisting of: an optical sensor, a magnetic sensor, a depth sensor, and a sonic tracking sensor. In some embodiments, the apparatus may further comprise a camera configured to detect overlapping areas between the local display and the external display. In some embodiments, the apparatus may further comprise wherein the head-mounted display is configured to display content of the external display in the overlapping area. In some embodiments, the apparatus may further comprise wherein the mobile application is configured to render the overlapping area of the external display with a mask color. In some embodiments, the apparatus may further comprise a camera configured to detect image artifacts on the external and/or head-mounted display. In some embodiments, the apparatus may further comprise wherein the image artifacts are occlusions. In some embodiments, the apparatus may further comprise wherein the image artifacts are overlaps between the local and external display. In some embodiments, the apparatus may further comprise wherein the head-mounted display is configured to extend the display area of the external display. In some embodiments, the apparatus may further comprise wherein the streaming module is configured to display a third virtual element on a second external display, the third virtual element partitioned from the 3D content. In some embodiments, the apparatus may further comprise wherein the head-mounted display is configured to display the second portion between the external display and the second external display. In some embodiments, the apparatus may further comprise wherein the external display and second external displays are active stereo displays, each having a respective display frequency. In some embodiments, the apparatus may further comprise a camera configured to detect the respective display frequencies using a camera attached to the local display. In some embodiments, the apparatus may further comprise wherein the respective display frequencies are different. In some embodiments, the apparatus may further comprise wherein the head-mounted display is configured to operate as shutter glasses, and wherein the head-mounted display is configured to block a first eye for the external display at a first display frequency of the respective display frequencies, and wherein the head-mounted display is configured to block the first eye for the second external display at a second display frequency of the respective display frequencies. In some embodiments, the apparatus may further comprise wherein the external display is an active stereo display. In some embodiments, the apparatus may further comprise wherein the head-mounted display is configured to block a first eye of a user and to display the first and second virtual elements for a second eye of the user. In some embodiments, the apparatus may further comprise wherein blocking the first eye comprises blocking a portion of the head-mounted display occupied by the external display as seen by the first eye. In some embodiments, the apparatus may further comprise instructions for displaying an RGB image for the first eye on the local display.

What is claimed:

1. An apparatus comprising:
an augmented reality (AR) head-mounted display configured to be switched to an active shutter mode;
a front-facing camera;
a processor; and
a non-transitory computer-readable medium storing instructions that are operative, when executed by the processor, to cause the apparatus to:
detect a first portion of content as displayed on an external display as alternating frames of a stereoscopic projection, the first portion of the content being related to an augmented reality (AR) presentation;
responsive to detecting the first portion of the content as displayed on the external display as alternating frames of the stereoscopic projection, switch the AR head-mounted display (HMD) to an active shutter mode; and
in the active shutter mode:
produce a shutter effect synchronized to the alternating frames of the stereoscopic projection while simultaneously present a second portion of the content related to the AR presentation.

2. The apparatus of claim 1, further comprising a spatially-controllable shuttering layer configured to block the first portion, and further configured to pass light through the second portion.

3. The apparatus of claim 2, wherein the spatially-controllable shuttering layer comprises a liquid crystal display layer.

4. The apparatus of claim 1, wherein instructions that are operative, when executed by the processor, to cause the apparatus to present the second portion of the content related to the AR presentation comprise:
displaying left-eye imagery for the second portion of the content related to the AR presentation in a portion of the AR HMD associated with a left-eye display, while simultaneously displaying the shutter effect for a right eye in a portion of the AR HMD associated with a right-eye display, and
displaying right-eye imagery for the second portion of the content related to the AR presentation in a portion of the AR HMD associated with the right-eye display, while simultaneously displaying the shutter effect for a left eye in a portion of the AR HMD associated with the left-eye display,
wherein displaying of the AR presentation is synchronized with the shutter effect.

5. An apparatus comprising:
a head-mounted display configured to displayed a first virtual element, the head-mounted display having a portion associated with a left-eye display and having a portion associated with a right-eye display;
a forward-facing camera associated with the head-mounted display, the camera being configured to capture images coming from a portion of an external display;
a processor; and
a non-transitory computer-readable medium storing instructions that are operative, when executed by the processor, to cause the apparatus to:
responsively determine that the captured images comprise a second virtual element as displayed on the external display as alternating images of a stereoscopic image sequence, the second virtual element being related to an AR presentation;
detect a frequency of the captured images by analyzing sequential images of the captured images; and
shutter, at the detected frequency, the head-mounted display in synchronization with the images of the stereoscopic image sequence while also presenting left-eye imagery of the first virtual element related to the AR presentation in the portion of the head-mounted display associated with the left-eye display, and right-eye imagery of the first virtual element related to the AR presentation in the portion of the head-mounted display associated with the right-eye display.

6. The apparatus of claim 5, wherein the instructions are further operative, when executed by the processor, to further cause the apparatus to connect to the external display.

7. The apparatus of claim 5, further comprising:
a network module configured to connect to the external display; and
a streaming module configured to display the second virtual element on the external display.

8. The apparatus of claim 5,
wherein the head-mounted display is configured to operate as shutter glasses,
wherein the head-mounted display is configured to block a first eye for the external display at a first display frequency, and
wherein the head-mounted display is configured to block the first eye for a second external display at a second display frequency.

9. The apparatus of claim 5, wherein the instructions are further operative, when executed by the processor, to further cause the apparatus to cause the external display to display the second virtual element on the external display.

10. The apparatus of claim 5, wherein the instructions are further operative, when executed by the processor, to further cause the apparatus to:
intercept a set of three-dimensional (3D) content; and
partition the set of 3D content into the first virtual element and the second virtual element.

11. The apparatus of claim 10,
wherein the instructions are further operative, when executed by the processor, to further cause the apparatus to:
partition the set of 3D content further into a third virtual element; and
display the third virtual element on a second external display.

12. The apparatus of claim 11, wherein the second external display is an active stereo display having an associated display frequency.

13. A method comprising:
detecting a first portion of content as displayed on an external display as alternating frames of a stereoscopic projection, the first portion of the content being related to an augmented reality (AR) presentation;
responsive to detecting the first portion of the content as displayed on the external display as alternating frames of the stereoscopic projection, switching an AR head-mounted display (HMD) to an active shutter mode; and
in the active shutter mode:
producing a shutter effect synchronized to the alternating frames of the stereoscopic projection while simultaneously presenting a second portion of the content related to the AR presentation.

14. The method of claim 13, wherein the shutter effect comprises:
alternating between blocking a left eye view while content for a right eye is rendered, and blocking the right eye view while content for the left eye is rendered.

15. The method of claim 13, wherein the shutter effect comprises:
blocking a first portion, corresponding to a view of the external display, of a view of a user; and
passing light through a second portion, corresponding to a view without the view of the external display, of the view of the user.

16. The method of claim 15, further comprising:
in the active shutter mode,
selectively blocking only the first portion of the view of the user,
wherein the first portion of the view of the user corresponds to and further overlaps with the view of the external display based on display location and orientation information regarding the external display.

17. The method of claim 13, wherein presenting the second portion of the content related to the AR presentation comprises:
displaying left-eye imagery for the second portion of the content related to the AR presentation in a portion of the AR HMD associated with a left-eye display, while simultaneously displaying the shutter effect for a right eye in a portion of the AR HMD associated with a right-eye display, and
displaying right-eye imagery for the second portion of the content related to the AR presentation in a portion of the AR HMD associated with the right-eye display, while simultaneously displaying the shutter effect for a left eye in a portion of the AR HMD associated with the left-eye display,
wherein displaying of the AR presentation is synchronized with the shutter effect.

18. The method of claim 13, further comprising:
determining a shutter frequency for alternating in the active shutter mode; and
setting the alternating between blocking the left eye view and blocking the right eye view to occur at the shutter frequency.

19. The method of claim 18, wherein determining the shutter frequency comprises analyzing images captured by the front-facing camera of the AR head-mounted display.

20. The method of claim 19, wherein determining the shutter frequency further comprises transforming one or more of the images to compensate for perspective between the AR head-mounted display and the active stereo display surface.

21. The method of claim 18, wherein determining the shutter frequency comprises detecting a synchronization signal associated with the external display.

22. The method of claim 13, wherein detecting the first portion of content as displayed on the external display comprises analyzing images captured by the front-facing camera of the AR head-mounted display.

23. The method of claim 13, wherein detecting the first portion of content as displayed on the external display comprises detecting a synchronization signal associated with the active stereo display surface.

* * * * *